(12) United States Patent
Alvarez et al.

(10) Patent No.: US 11,680,391 B2
(45) Date of Patent: Jun. 20, 2023

(54) SURFACES WITH HIGH SURFACE AREAS FOR ENHANCED CONDENSATION AND AIRBORNE LIQUID DROPLET COLLECTION

(71) Applicant: Northwestern University, Evantson, IL (US)

(72) Inventors: Natalia Alvarez, Evanston, IL (US); Neelesh A. Patankar, Buffalo Grove, IL (US); Kyoo-Chul Park, Wilmette, IL (US); Youhua Jiang, Chicago, IL (US)

(73) Assignee: Northwestern University, Evanston, IL (US)

(*) Notice: Subject to any disclaimer, the term of this patent is extended or adjusted under 35 U.S.C. 154(b) by 0 days.

(21) Appl. No.: 16/963,925

(22) PCT Filed: Jan. 25, 2019

(86) PCT No.: PCT/US2019/015144
§ 371 (c)(1),
(2) Date: Jul. 22, 2020

(87) PCT Pub. No.: WO2019/147935
PCT Pub. Date: Aug. 1, 2019

(65) Prior Publication Data
US 2020/0362543 A1 Nov. 19, 2020

Related U.S. Application Data

(60) Provisional application No. 62/621,849, filed on Jan. 25, 2018.

(51) Int. Cl.
*E03B 3/28* (2006.01)
*B01D 5/00* (2006.01)
(Continued)

(52) U.S. Cl.
CPC ............... *E03B 3/28* (2013.01); *B01D 5/006* (2013.01); *F28F 13/187* (2013.01); *F28D 2021/0063* (2013.01)

(58) Field of Classification Search
CPC ... B01D 5/006; E03B 3/28; F28B 1/00; F28C 1/16; F28D 2021/0061; F28D 2021/0063; F28F 13/187; G01N 1/2202
See application file for complete search history.

(56) References Cited

U.S. PATENT DOCUMENTS 1,792,134 A    6/1928  Watts
2,209,661 A *  7/1940  Pickstone .................. F28D 7/16
                                                        165/113
(Continued)

FOREIGN PATENT DOCUMENTS

CN    2905224 Y    5/2007
EP    0851785 B1   6/2003
(Continued)

OTHER PUBLICATIONS

Kyoo-Chul Park et al., "Condensation on slippery asymmetric bumps," Nature, vol. 531, Mar. 3, 2016, pp. 78-82.
(Continued)

*Primary Examiner* — Eric S Ruppert
*Assistant Examiner* — Hans R Weiland
(74) *Attorney, Agent, or Firm* — Bell & Manning, LLC

(57) ABSTRACT

Omniphilic and superomniphilic surfaces for simultaneous vapor condensation and airborne liquid droplet collection are provided. Also provided are methods for using the surfaces to condense liquid vapor and/or capture airborne liquid droplets, such as water droplets found in mist and fog. The surfaces provide enhanced capture and transport effi-
(Continued)

Figure 1:
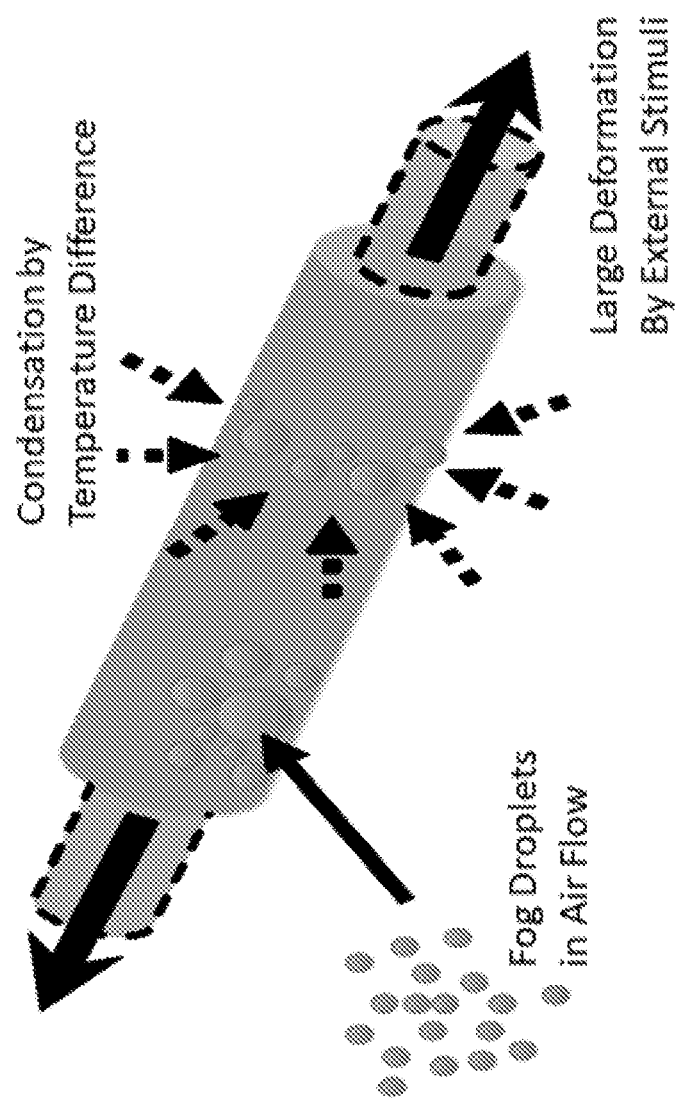

ciency based on preferential capillary condensation on high surface energy surfaces, thin film dynamics, and force convection.

17 Claims, 19 Drawing Sheets

(51) Int. Cl.
    *F28D 21/00*      (2006.01)
    *F28F 13/18*      (2006.01)

(56) References Cited

U.S. PATENT DOCUMENTS

| | | | |
|---|---|---|---|
| 3,290,868 A * | 12/1966 | Upor | B01D 46/12 55/343 |
| 3,818,718 A * | 6/1974 | Freese | F28D 7/103 62/93 |
| 4,022,593 A | 5/1977 | Lerner | |
| 4,137,647 A | 2/1979 | Clark, Jr. | |
| 4,670,026 A | 6/1987 | Hoenig | |
| 4,697,462 A * | 10/1987 | Daube, Jr. | G01N 1/18 55/528 |
| 4,818,257 A | 4/1989 | Kennedy et al. | |
| 5,012,195 A | 4/1991 | Harrold | |
| 5,020,334 A * | 6/1991 | Wilkinson | F24F 3/1417 62/271 |
| 5,275,643 A | 1/1994 | Usui | |
| 5,277,704 A | 1/1994 | Miller et al. | |
| 5,795,369 A * | 8/1998 | Taub | B01D 46/0005 55/341.1 |
| 6,110,247 A * | 8/2000 | Birmingham | B01D 45/08 55/DIG. 39 |
| 6,210,270 B1 | 4/2001 | Niksic et al. | |
| 7,563,312 B2 | 7/2009 | Wascher et al. | |
| 7,758,665 B2 | 7/2010 | Ziebold et al. | |
| 8,425,657 B2 | 4/2013 | Ursem et al. | |
| 8,632,616 B2 | 1/2014 | Azwell et al. | |
| 8,636,819 B2 | 1/2014 | Azwell et al. | |
| 8,657,897 B2 | 2/2014 | Kayat et al. | |
| 8,894,478 B1 | 11/2014 | Stillwagon | |
| 9,005,340 B2 | 4/2015 | Azwell et al. | |
| 9,259,742 B2 | 2/2016 | Alt et al. | |
| 9,352,258 B2 | 5/2016 | Park et al. | |
| 10,118,116 B2 | 11/2018 | Jeong | |
| 2004/0079231 A1 | 4/2004 | Green et al. | |
| 2009/0081373 A1 | 3/2009 | Choate | |
| 2010/0311316 A1 | 12/2010 | Tindale et al. | |
| 2012/0048115 A1 | 3/2012 | Crabtree et al. | |
| 2012/0073320 A1 * | 3/2012 | Seoane | F25B 39/024 62/291 |
| 2012/0308775 A1 * | 12/2012 | You | B82Y 40/00 428/148 |
| 2016/0136554 A1 | 5/2016 | Swaminathan et al. | |
| 2018/0272358 A1 | 9/2018 | Damak et al. | |
| 2018/0361288 A1 | 12/2018 | Nie et al. | |
| 2022/0176281 A1 | 6/2022 | Park et al. | |

FOREIGN PATENT DOCUMENTS

| | | |
|---|---|---|
| EP | 1572321 B1 | 2/2007 |
| RU | 2245967 C2 | 2/2005 |
| WO | WO 97/27928 | 8/1997 |
| WO | WO 2004/108251 A1 | 12/2004 |
| WO | WO 2016/069785 A1 | 5/2016 |

OTHER PUBLICATIONS

Kyoo-Chul Park et al., "Optimal Design or Permeable Fiber Network structures for Fog Harvesting," *Langmuir*, pp. 1-36.

Anish Tuteja et al., "Robust Omniphobic surfaces," PNAS, Nov. 25, 2008, vol. 105, No. 47, pp. 18200-18205.

Daniel M. Fernandez et al., "Fog Water Collection Effectiveness: Mesh Intercomparisons," pp. 1-14.

Maher Damak et al., "Electrostatically driven fog collection using space charge injection," *Sci. Adv.*, 2018, vol. 4: eaao5323, Jun. 8, 2018, pp. 1-8.

Weiwei Shi et al., "Fog Harvesting Harps," *ACS Appl. Mater. Interfaces*, 2018, vol. 10, pp. 11979-11986.

Juan de Dios Rivera, "Aerodynamic collection efficiency of fog water collectors," *Atmospheric Research*, vol. 102, 2011, pp. 335-342.

Stuart C. Thickett et al., "Biomimetic Surface Coatings for Atmospheric Water Capture Prepared by Dewetting of Polymer Films," *Adv. Mater.*, 2011, vol. 23, pp. 3718-3722.

Hyungryul J. Choi et al., "Superoleophilic Titania Nanoparticle Coatings with Fast Fingerprint Decomposition and High Transparency," *ACS Appl. Mater. Interfaces*, 2017, vol. 9, pp. 8354-8360.

The International Search Report and Written Opinion issued in International Patent Application No. PCT/US19/15144 dated Apr. 11, 2019, pp. 1-10.

The Non-Final Office Action dated Feb. 13, 2023 for U.S. Appl. No. 17/602,175; pp. 1-26.

* cited by examiner

FIG. 6A — Tilted rigid wires

FIG. 6B — Flexible wires

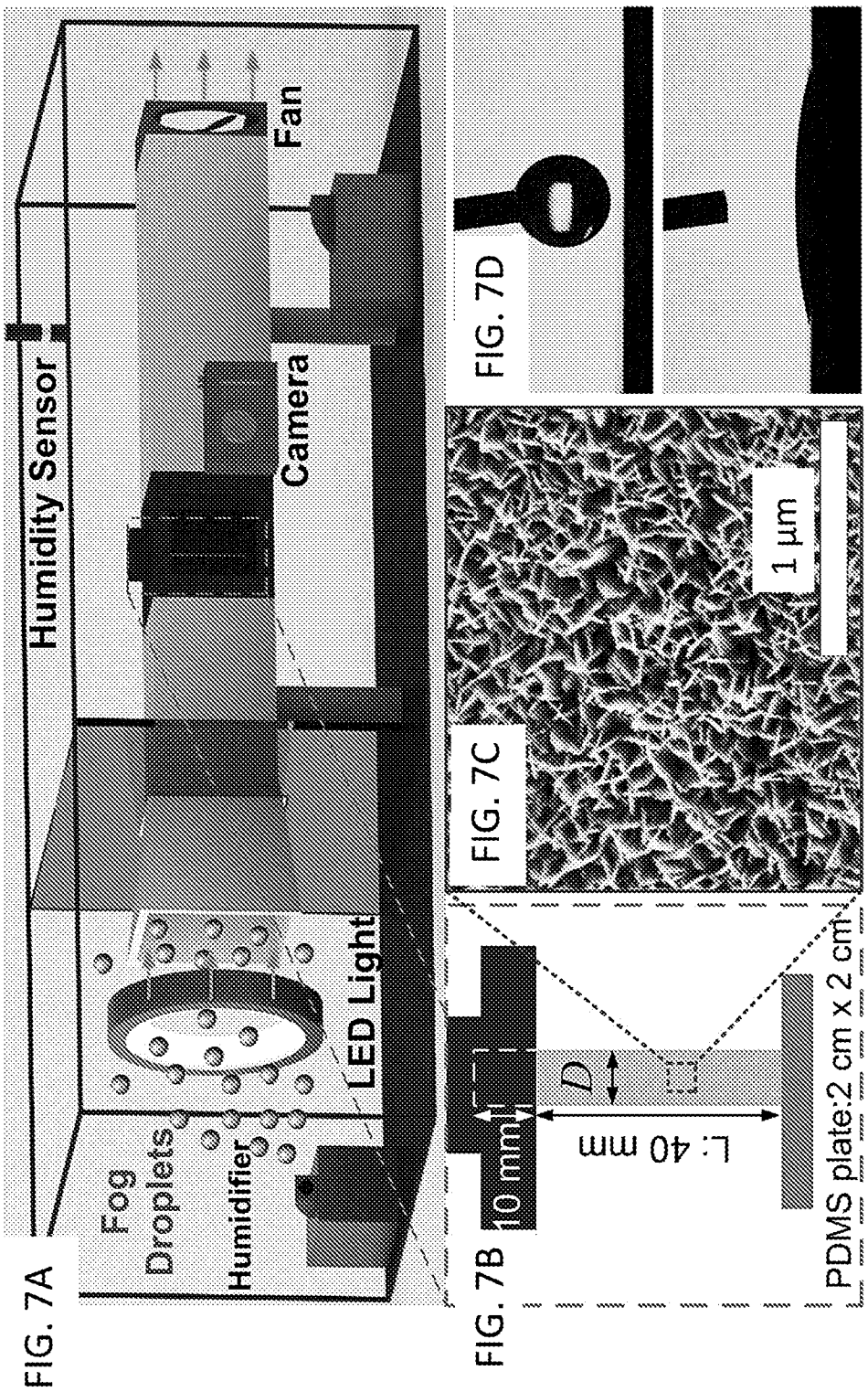

SURFACES WITH HIGH SURFACE AREAS FOR ENHANCED CONDENSATION AND AIRBORNE LIQUID DROPLET COLLECTION

CROSS-REFERENCE TO RELATED APPLICATIONS

This application is a National Stage of International Application No. PCT/US19/15144, filed Jan. 25, 2019, which claims the benefit of U.S. Patent Application No. 62/621,849, filed Jan. 25, 2018, the contents of which are herein incorporated by reference.

BACKGROUND

Collecting liquid from vapor and mist and/or fog is important for a wide range of applications, including fuel processing, thermal/solar desalination, distillation towers, toxic chemical vapor removal, semiconductor manufacturing processing, water collection from the cooling towers of various systems, such as thermal power plants, humidification and dehumidification systems for buildings and transportation, indoor air quality, atmospheric water collection, and agricultural systems, such as greenhouses. However, conventional technology is specialized for either vapor condensation or mist/fog elimination, but not both, because the surface designs are fundamentally limited to porous membranes or filter surface structures that facilitate only the capture of vapor or only the capture of mist/fog. Furthermore, the main principles of fast droplet growth by the two mechanisms and rapid droplet transport are considered to be incompatible. The conventional technologies have also suffered from critical problems in separation processes—clogging and biofouling. These problems critically lower the performance of state-of-the-art porous surfaces and require a high pressure drop, heating, regular cleaning, or replacement.

SUMMARY

Surfaces for simultaneous vapor condensation and airborne liquid droplet collection are provided. Also provided are methods for using the surfaces to condense liquid vapor and/or capture airborne liquid droplets, such as water droplets found in mist and fog.

One embodiment of an airborne liquid droplet harvesting device includes a tube having an interior surface that defines an air channel; and a plurality of wires extending from the interior surface into the air channel. The wires may be superhydrophilic, mechanically flexible, angled along the direction of air flow, and/or may have diameters in the range from 10 μm to 10 mm.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1 depicts a schematic diagram of vapor condensation and mist elimination on an omniphilic hierarchical flexible hair.

FIG. 2 depicts a schematic diagram of omniphilic wires on a flat support surface with approximate dimensions.

FIG. 3 depicts a schematic diagram of vertical omniphilic wire structures in a mist/fog environment.

FIG. 4 depicts a schematic diagram of water vapor condensing as a film on vertical superomniphilic wires on a planar support substrate in a forced convection environment.

FIG. 5 depicts a schematic diagram of condensation on omniphilic or superomniphilic wires to form thin films that will be transported along the wires.

FIG. 6A-6D show embodiments of the superomniphilic surfaces that have a tubular geometry. In FIG. 6A the wires are non-elastic (rigid) and have an angle of >90° with respect to the interior surface of the tube. In FIG. 6B, the wires are mechanically flexible. Initially, the form an angle of 90° with respect to the interior surface of the tube, but when a flow of air commences they undergo an elastic deformation along the direction of air flow. FIG. 6C and FIG. 6D show cross-sectional views of a plurality of the tubes arranged in a honeycomb configuration within a tubular housing. The tubes in FIG. 6C have a circular cross-section. The tubes in FIG. 6D have a hexagonal cross-section.

FIG. 7A depicts a schematic of a customized wind tunnel used in Example 1. FIG. 7B depicts a schematic of the wire and PDMS plate suspended in the wind tunnel. FIG. 7C depicts a SEM image of the nanotextured, superhydrophilic aluminum wire. FIG. 7D depicts a droplet (~3 μL) profile before (top) and after (bottom) being deposited on a flat aluminum surface that possesses the same nanotextures shown in FIG. 7C.

FIG. 8 depicts the growth of droplet volume over time for wires of 0.41 mm in diameter under fog flow speeds of 0.5 and 2.0 m/s and for the wire of 2.06 mm in diameter under a fog flow speed of 0.5 m/s.

FIG. 9A-FIG. 9D depict the fog collection rate (left y-axis) and the fog collection rate per unit area (right y-axis) plotted with respect to wire diameter (bottom x-axis) and the corresponding Stokes number (top x-axis) for wires under fog flow speeds of (FIG. 9A) 0.5, (FIG. 9B) 1.0, (FIG. 9C) 2.0, and (FIG. 9D) 3.0 m/s.

FIG. 10A-FIG. 10C depict the fog collection rate per unit area of wires with different wire diameters under various fog flow speeds plotted with respect to (FIG. 10A) the Stokes number and (FIG. 10C) the deposition efficiency. FIG. 10B shows the deposition efficiency as a function of the Stokes number, $\eta_d = S_t/(S_t + \pi/2)$, plotted with respect to the Stokes number. The value of $R^2$ (coefficient of determination) close to 1 in (FIG. 10C) that compares the y-axis of (FIG. 10A) and the y-axis of (FIG. 10B) indicates the strong linearity of data based on the experiments.

FIG. 11 depicts onset time of fog collection on wires ($d_{wire}$=0.51 mm) with different wettabilities. The SEM image shows the nanostructures commonly found on the surface of superhydrophilic (SHphi) and superhydrophobic (SHpho) aluminum wires. Hphi and Hpho represent hydrophilic and hydrophobic, respectively.

FIG. 12 depicts onset time of fog collection on wires with different diameters and wettabilities plotted with respect to wire diameter.

FIG. 13 depicts onset time of fog collection on wires with various diameters and wettabilities plotted with respect to the non-dimensionalized onset time, $(\cos\theta_R - \cos\theta_A)/2\eta_d$, showing the excellent linearity captured by the coefficient of determination, $R^2$, 0.95.

FIG. 14. Fog collection rates using a single wire, four wires, and five wires are plotted with respect to fog flow speed. The hollow square symbols represent the predicted fog collection rates using Equation 5 based on the measured collection rate of the single wire of D=2.06 mm under a wind speed of 0.5 m/s.

DETAILED DESCRIPTION

Omniphilic or superomniphilic surfaces for simultaneous vapor condensation and airborne liquid droplet collection are provided. Also provided are methods for using the superomniphilic surfaces to condense liquid vapor and/or capture airborne liquid droplets, such as water droplets found in mist and fog. The superomniphilic surfaces provide enhanced capture and transport efficiency based on preferential capillary condensation on high surface energy surfaces, thin film dynamics, and force convection. Applications for the superomniphilic surfaces include those listed in the Background, above.

The process of airborne liquid droplet collection, involves two different steps: (1) droplet capture and (2) drainage (transport). The first step is the deposition of the droplets on a surface on which those droplets impact. This is a process governed by aerodynamics, which is fundamentally different from the nucleation and condensation that occurs during dew harvesting. The second step is the transport of the captured liquid to a reservoir, typically by gravity, which can be enhanced under certain conditions, for example, when the loss by evaporation and re-entrainment of captured liquid into the liquid droplet-laden air flow is minimized.

The superomniphilic surfaces are composed of a series of aligned superomniphilic surface structures extending from a support surface that acts as a liquid channel and heat sink. The heat sink can be created with a chiller (heat exchanger) or, in an outdoor environment, be replaced by cool night soil or the wall of a building. The support surface can also be superomniphilic. The superomniphilic surfaces can be have a tubular configuration to provide an airborne liquid droplet harvesting device, wherein the interior surface of tube defines an air channel and the wires extend from the interior surface into the air channel. When a flow of air with airborne liquid droplets passes into and through the air channel, airborne droplets collect on the wires, forming a liquid film thereon. This liquid film can then drain to the interior surface of the tube and be collected. A plurality of such tubes can be arranged with their long axes aligned in an array within a housing. For example, the tubes can be arranged in a honeycomb pattern or in a cubic close packing arrangement.

The air flow from which the liquid is harvested may be a naturally-occurring air flow, such as wind. However, the air flow may be a flow of air generated from a man-made source. Moreover, the direction and/or speed of the flow of the air may be created or enhanced using an air flow generator, such as a fan, a mechanical blower, or a wind tunnel.

The superomniphilic structures, such as wires, can be disposed in a regular pattern or randomly on the support surface. The structures can be densely packed on the support surface. By way of illustration, some embodiments of the superomniphilic surfaces, including those having a tubular configuration, have a superomniphilic structure (e.g., wire) density of at least $10^4$ per $m^2$. In some embodiments, the superomniphilic structure density is in the range from $10^4$ to $10^{10}$ per $m^2$.

The superomniphilic surfaces can be used to harvest water from sources such as mist and fog. Mist and fog are similar in that both comprise airborne liquid water droplets, however they can be distinguished based on visibility. The phenomenon is called fog if the visibility is one kilometer (1,100 yards) or less; in some instances, the water droplets in fog reduce visibility to less than 100 meters. Mist makes a beam of light visible from the side via refraction and reflection on the suspended water droplets. Generally, the airborne liquid droplets, including the water droplets present in mist and fog, are small enough to remain suspended in air without falling to the ground. The superomniphilic surfaces can also be used to harvest other airborne liquids, including liquids comprising hydrocarbon or fluorocarbon molecules, acids, and bases, in organic solvents, liquid crystal, polymer melts, or liquefied gases. Organic polar or nonpolar liquids that can be collected using the superomniphilic structures include alcohols (e.g., methanol and/or ethanol). The mist, fog, or other airborne liquid droplets can be naturally occurring or the byproduct of an industrial process carried out in a factory or power plant.

The superomniphilic surfaces are liquid-loving surfaces. For the purposes of this disclosure, a superomniphilic surface is a surface that provides a contact angle of 5° or less for the liquid that is being harvested. However, although superomniphilic surfaces, support substrates, and/or structures represent preferred embodiments, these components need not be superomniphilic. In some embodiments the surfaces, supports, and structures (wires) are merely omniphilic, having a contact angle of 30° or less (e.g., greater than 5°, but no greater than 30°) for the liquid that is being harvested, a contact angle of 20° or less for the liquid that is being harvested, or a contact angle of 10° or less for the liquid that is being harvested. Thus, if water is the liquid being harvested, the contact angles recited above would be water contact angles. The contact angles recited herein refer to contact angles measured at 23° C. but can be at different temperature depending on the operating temperature of the systems of interest. Contact angles may be measured using the static sessile drop method.

The superomniphilic surfaces can harvest airborne liquid droplets via both condensation and direct deposition of airborne droplets. The simultaneous vapor condensation and liquid droplet capture by one embodiment of a superomniphilic structure (shown as a superomniphilic "hair") is illustrated schematically in FIG. 1. The harvested liquid forms an extremely thin film that slides off the hairs and is collected and can then be used for various purposes, including drinking water, water for crops, and cooling water for power plants.

The design of the superomniphilic surfaces can be optimized depending on the intended applications and the superomniphilic surfaces can be created with a variety of materials and surface processing methods. By way of illustration, the surface structures can be composed of polymers, metals, ceramics, carbon-based materials such as carbon nanotubes, biomaterials or a combination thereof. Fabrication methods that can be used to form the superomniphilic surfaces include three-dimensional (3D) extrusion printing, molding, casting, and dip coating.

The aligned superomniphilic surface structures, which are desirably but not necessarily mechanically flexible, are elongated structures with high aspect ratios and may have hierarchical surface topographies. The high aspect ratio structures include structures having shapes that can be referred to as wires. By way of illustration, various embodiments of the surface structures have an aspect ratio (length (L)/diameter (2R)) of at least 3. However, the aspect ratio can be much higher, including, for example, at least 10, at least 50, and at least 100. The superomniphilic support surface may be, for example, a planar or substantially planar support surface. However, tube-shaped support surfaces are advantageous because they have the ability to channel air and to direct the flow of the collected liquid within their channels.

The superomniphilic properties of the surface structures and the support surface can be induced by various methods, including, for example, sanding to increase surface roughness, by constructing them from aluminum, and/or immersing them in boiling water prior to use. In some embodiments of the superomniphilic surface, the surface structures and/or the support surface may include a coating to enhance their superomniphilic character and/or to provide them with the ability to self-clean. For example, in some embodiments, the coating comprises superomniphilic nanoparticles, which may be superomniphilic metal oxide nanoparticles, such as $TiO_2$ nanoparticles. In some embodiments of the superomniphilic surfaces, the coatings on the surface structures also provide anti-biofouling or anti-chemical-fouling properties, which are advantageous in a contaminated environment. For example, a $TiO_2$ coating can maintain the superomniphilic surfaces free of biofouling or chemical-fouling when the surfaces are used under natural sunlight or additional light that can induce photocatalytic decomposition of organic contaminants.

Some embodiments of the superomniphilic surfaces and the methods described herein are based, at least in part, on a synergistic combination of: (i) the superomniphilicity and self-cleaning effects of the high aspect ratio structures offered by a simple nanoparticle coating, (ii) high efficiency of mist capture and vapor condensation in multiphase flow enhanced by the hierarchical surface topography of the superomniphilic surface structures, (iii) energy-efficient removal of chemicals by inertio-capillary force, and/or (iv) the effect of flexible and adaptive surface structures on the overall separation process that can be further applied to the separation of liquid-liquid mixture.

Figure 2:
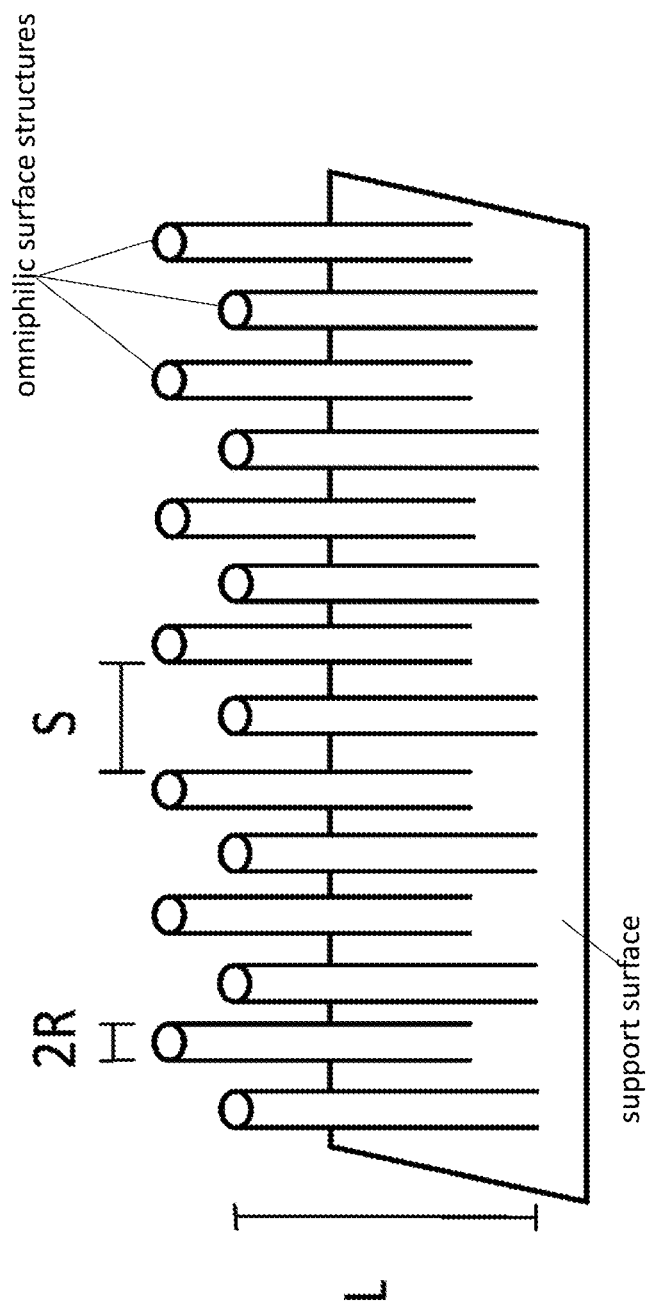
Figure 3:
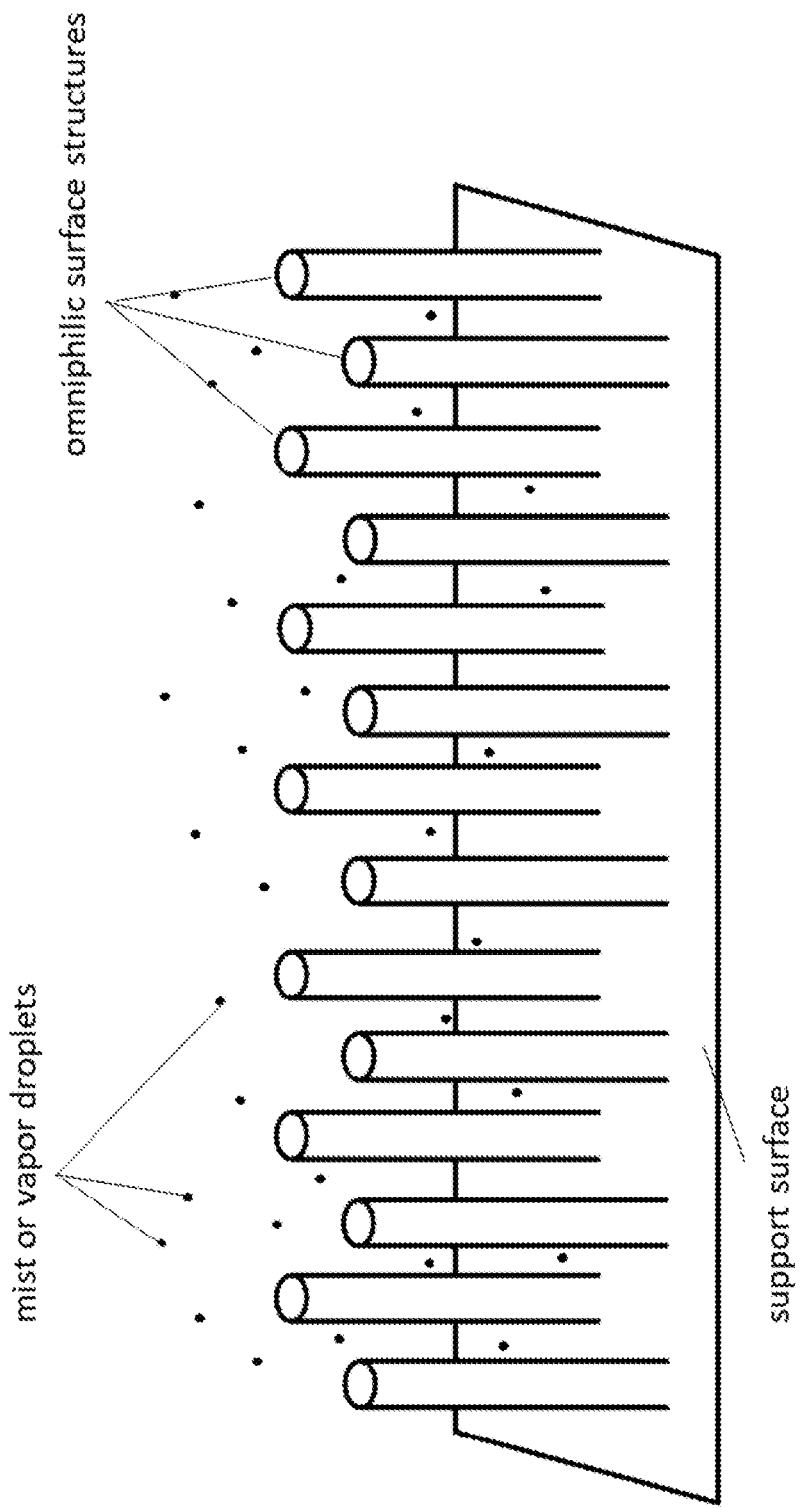
Figure 4:
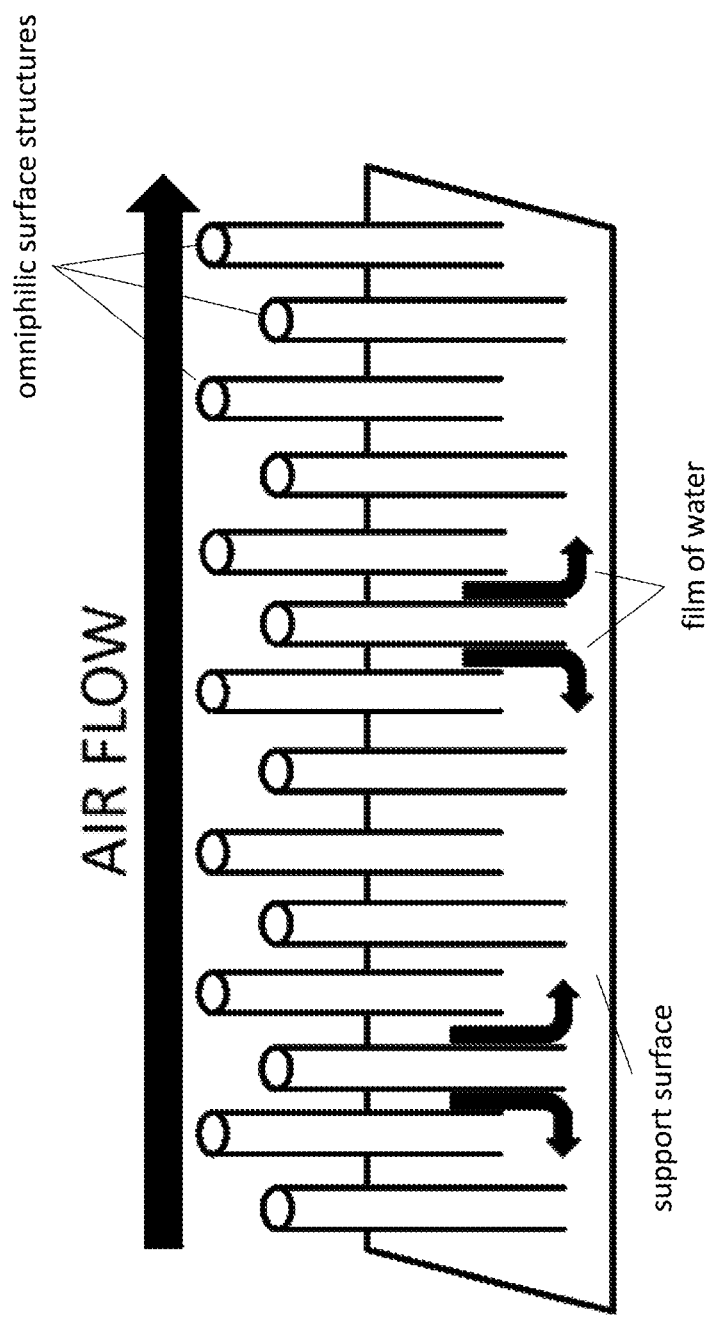
Figure 5:
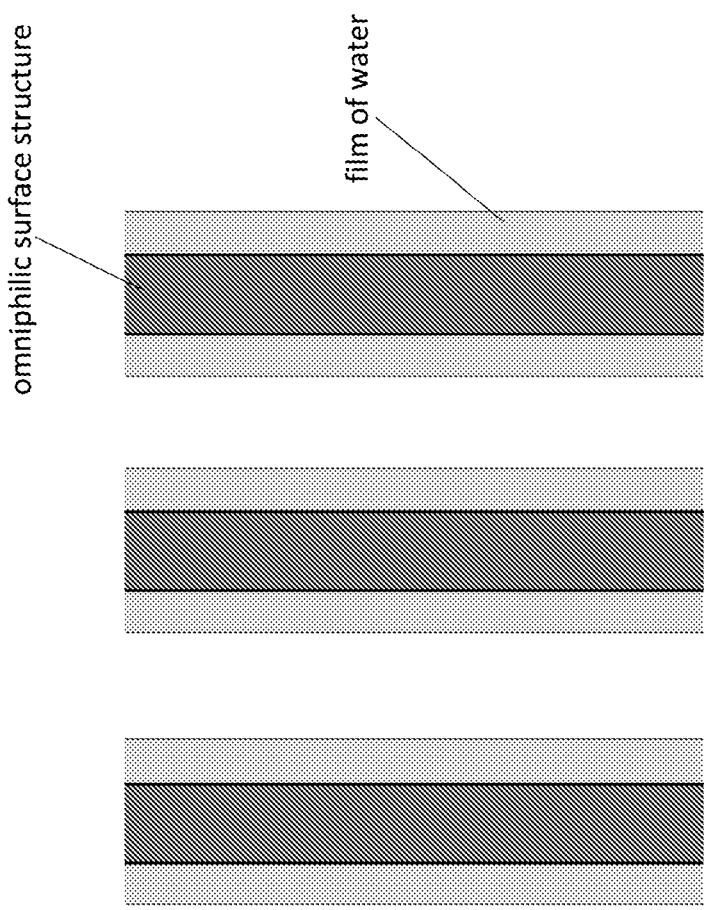

One embodiment of a superomniphilic surface is shown schematically in FIG. 2. This embodiment includes a series of aligned superomniphilic surface structures (cylindrical wires in this embodiment) vertically connected to a flat support surface that acts as a liquid channel and heat sink. The surface temperature of the wires, being cooler than the ambient temperature, will draw the water vapor from the surrounding air and condense it into a thin film (FIG. 4). The same superomniphilic surface can be used to capture mist and/or fog (FIG. 3). The vertical orientation of the surface structures prevents hanging droplets from clogging the spaces between the wires and utilizes various forces such as gravitational force or air drag force for transport. That is, the water collected on the wires is transported along the wires under the effect of the various force (FIG. 5).

The optimized control of forced convection (lower than a critical air velocity) can be used to improve the condensation and airborne liquid droplet elimination rate. If the length (L) of the wires is longer than the capillary length (i.e., the ratio between the gravitational effect and the capillary effect), the vertical superomniphilic structures can allow the water to be pulled downward for collection. The radius (R) of wires and the spacing (S) (FIG. 2) of them determines the air flow in the structure. To maximize the surface area, the wires should be packed at high density, which can be measured by $(R+S)^2/R^2$.

Figure 6C:
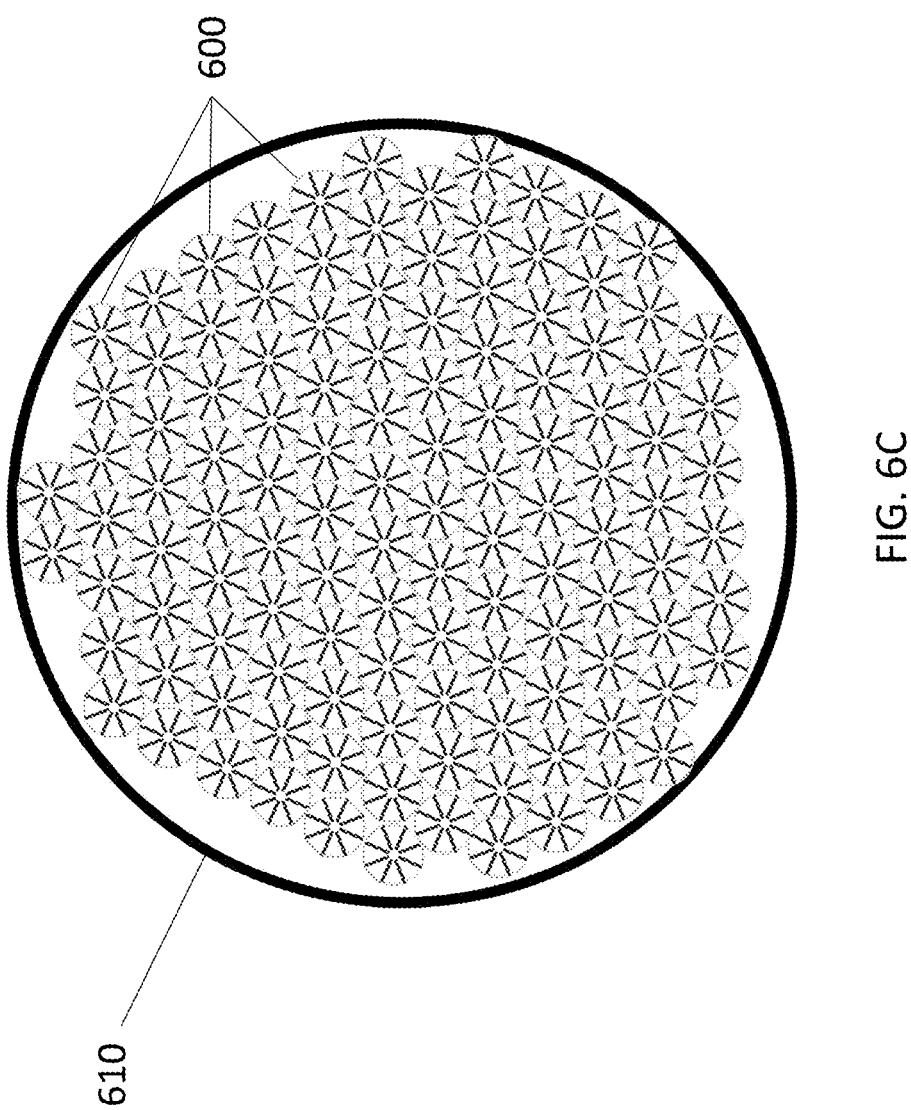
Figure 6D:
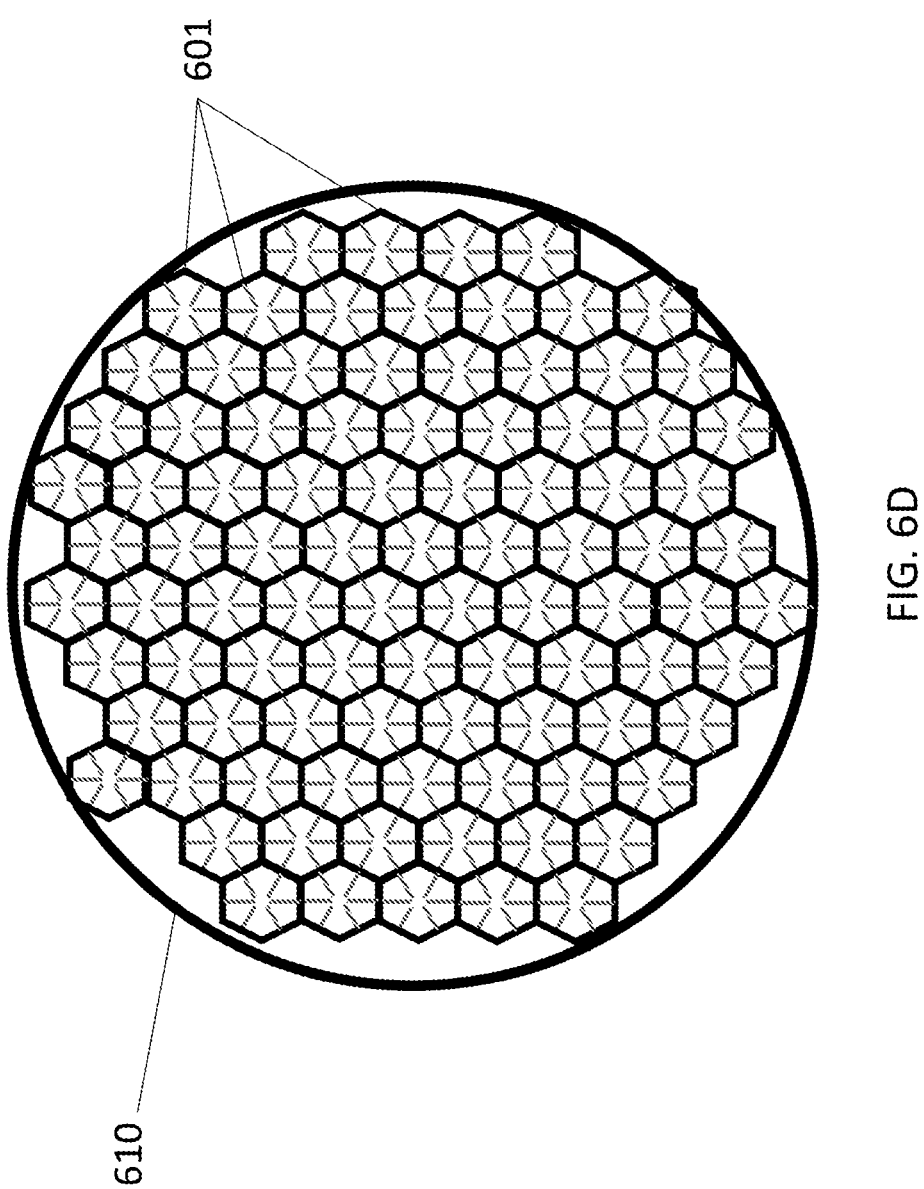

Embodiments of the superomniphilic surfaces that have a tubular geometry are shown in FIG. 6A and FIG. 6B. In these devices, the support surface for the superomniphilic structures, illustrated here as superomniphilic wires 602, 603, is a tube 600 having an interior surface 604 that defines an air channel. A plurality of superomniphilic wires 602, 603 extends away from the interior surface 604 and into the air channel. Although the tubes 600 in FIGS. 6A-6C have circular cross-sectional diameters, the tubes can have other cross-sectional shapes, including, for example, square, triangular, and hexagonal (FIG. 6D). FIGS. 6C and 6D show cross-sectional views of arrays containing a plurality of the tubes 600 arranged in a honeycomb configuration within a tubular housing 610. In FIG. 6C, the tubes have a circular cross-section. In FIG. 6D, the tubes 601 have a hexagonal cross-section for increased packing density. In the embodiment shown in FIG. 6A, the wires 602 are rigid and angled along the direction of air flow 606. In the embodiment of FIG. 6B, the wires 603 are mechanically flexible. As discussed in detail in Example 1, the diameter (width) of the wires affects the efficiency of liquid droplet harvesting. Thus, the wires desirably have diameters in the range from 10 μm to 10 mm. The wires may be sufficiently long to reach the center of the air channel, that is—to reach the longitudinal axis running through the center of the tube. However, in some embodiments the wires do not extend to the center of the air channel and in some embodiments the wires are long enough to extend beyond the center of the air channel. That is, the wires may have lengths that are equal to, shorter than, or longer than the internal diameter of the tube. The wires may extend outwardly from the interior surface at a 90° angle. However, they may also extend away from the interior surface at angles greater than or less than 90°. For the purposes of measuring the angle of the wires, 0° would correspond to a wire lying flat on the interior surface with it distal (i.e., free) end directed toward the entrance aperture of the tube and 180° would correspond to a wire lying flat on the interior surface with its distal end directed toward the exit aperture of the tube. In some embodiments of the tubular constructs, the wires are arranged at an angle of at least 100° with respect to the interior surface. This includes embodiment of the tubular structures in which the wires are arranged at an angle of at least 120° with respect to the interior surface. By way of illustration, the wires may be arranged at an angle in the range from 110° to 160°. The use of such angled wires is advantageous because it facilitates the draining of the liquid from the wires under the air drag force.

As shown in FIG. 6B, the wires may be mechanically flexible, such that the force of air containing airborne liquid droplets 608 flowing through the air channel causes the wires, which may initially have a vertical orientation (left panel), to undergo an elastic deformation (i.e., to bend reversibly) along the direction of the air flow (right panel). This is advantageous because elastic deformation can assist in the draining of the collected liquid from the wires. Polymeric wires, such as polyethylene, polytetrafluoroethylene, or polydimethylsiloxane wires, can be used as mechanically flexible wires. However, the particular wire material chosen will depend, at least in part, on the liquid being collected.

The tubes desirably have sufficiently large internal diameters to allow for the passage of a substantial air flow. By way of illustration, some embodiments of the tubes have an internal diameter of at least 50 μm. This includes tubes having internal diameters in the range from in the range from 50 μm to 500 mm and further includes tubes having internal diameters in the range from 10 mm to 500 mm and from 50 mm to 500 mm. The tube can be oriented with its longitudinal axes aligned with the direction of air flow. The air flow and the tube are desirably angled downward, that is—tilted downward with their exit apertures lower than their entrance apertures, such that liquid draining from the wires and collected in the air channel will flow out of the tube under the force of gravity and into a collection reservoir.

The superomniphilic surfaces can used in a wide range of applications, including thermal and solar desalination, atmospheric water harvesting (e.g., drawing fresh water from the air for human consumption), HVAC systems (e.g., concentrating water vapor for easy removal), power plant cooling towers (e.g., retrieval of water vapor released by the cooling process), fuel processing, distillation processes, environmental pollution reduction (e.g., collection of airborne fluid pollutants), indoor air quality control, and humidity control inside greenhouses. In dry climates, this technology can provide a source of drinking water for soldiers or travelers without having to draw from reservoirs. This technology can be also applied to remote off-grid populations or populations with water scarcity issues in reasonably humid climates.

Each of the embodiments of the superomniphilic surfaces, substrates, and structures (e.g., wires) described herein can also be implemented as non-superomniphilic (e.g., omniphilic) surfaces, support substrates, and structures.

EXAMPLES

Example 1

This example describes fog collection studies that focused on the aerodynamic system parameters, represented by the Stokes number, $St = \tau_{particle}/\tau_{flow} = (4\rho_{water} r_{fog}^2/9\mu_{air})/(D/\upsilon_0)$, which is defined as the ratio of the response time of a particle (e.g., fog droplet) to that of the flow around a single cylinder. (K.-C. Park, et al., Langmuir 29, 13269 (2013).) Here, $\rho_{water}$, $r_{fog}$, $\mu_{air}$, $\upsilon_o$, and D represent the water density, radius of fog droplets, air viscosity, fog flow speed, and wire diameter, respectively. A larger St indicates a greater inertial effect of fog droplets that overwhelms the aerodynamic effect that induces the droplets to go around an object such as a wire. In other words, droplets with a high St are less likely to deviate from their initial trajectory toward the wire, resulting in a higher fog collection efficiency.

The overall fog collection efficiency of a system, $\eta$, the ratio of the fog collection rate ($\dot{V}$) to the total fog flow rate through the system ($\dot{V}_{total}$), can be expressed as $$\frac{\dot{V}}{\dot{V}_{total}} = \eta = \eta_{ac}\eta_d\eta_{dr} \quad (1)$$

where $\eta_{ac}$, $\eta_d$, and $\eta_{dr}$ represent the aerodynamic collection efficiency associated with the fog-laden wind stream, the deposition efficiency of fog droplets, and the drainage efficiency of the captured liquid, respectively. (J. d. D. Rivera, Atmos. Res. 102, 335 (2011).) Specifically, $\eta_{ac}$ characterizes the percentage of the fog droplets in the unperturbed fog-laden flow that would collide with the fog collector. (J. d. D. Rivera, 2011 and D. Fernandez, et al., Aerosol Air Qual. Res. 18, 270 (2018).) It is related to the permeability (i.e., openness) of the collector and thus unity ($\eta_{ac}=1$) for an individual wire. $\eta_d$ represents the ratio of fog droplets deposited on a wire to the population in their initial trajectories toward the wire, which is a function of the Stokes number. $\eta_{dr}$ represents the ratio of the amount of captured liquid transported to a reservoir (i.e., the amount of collected liquid available for applications) to the total amount of captured liquid on the collector over a certain period of time. (D. Fernandez, et al., 2018.) $\eta_{dr}$ approaches unity ($\eta_{dr}=1$) if the evaporation and re-entrainment of the captured liquid into the fog-laden wind as well as the amount of remaining liquid on the fog-collecting device (i.e., fog harvesting wires excluding the reservoir) are minimized. This condition can be achieved when a surface with a high affinity to water is used, enabling a spontaneous spreading phenomenon (e.g., superhydrophilic surface with a very small advancing contact angle), under a high relative humidity environment and over a sufficiently long time (e.g., several times longer than the time required to form a thin film of water on the wire. It should be noted that the water film thickness is negligible compared to the wire diameter because of the capillary effects and gravitational effects). Therefore, the fog collection efficiency of an individual, superhydrophilic wire can be mainly characterized by the deposition efficiency ($\eta_d$), as $$\eta \approx \eta_d. \quad (2)$$

For a given $\dot{V}^{total}$, the fog collection rate ($\dot{V}$) should be linearly proportional to $\eta_d$, as $$\dot{V} \propto \eta_d. \quad (3)$$

A fundamental understanding and experimental verification of the linear correlation between the measured fog collection rate and the deposition efficiency are the main topics of this example.

Experiments were conducted in a wind tunnel at T=23±1° C. and under the relative humidity greater than 95%, similar to the schematic shown in FIG. 7A. An aluminum wire with an effective length of 40 mm was vertically suspended from the ceiling of the wind tunnel and a PDMS (Polydimethylsiloxane) plate was attached to the bottom end of the wire, serving as a collection site for the captured water flowing down the wire surface (FIG. 7B). Wires with nine different diameters of 0.33, 0.41, 0.51, 0.64, 0.81, 1.02, 1.3, 1.63, and 2.06 mm were used and were all functionalized to be superhydrophilic with nanostructures created by the boehmitization process (FIG. 7C and FIG. 7D). (Y. Xia, et al., Phys. Chem. C 117, 15279 (2013).) Four fog flow speeds were used (0.5, 1.0, 2.0, and 3 m/s), and the averaged results of at least three reproducible trials were reported.

Figure 8:
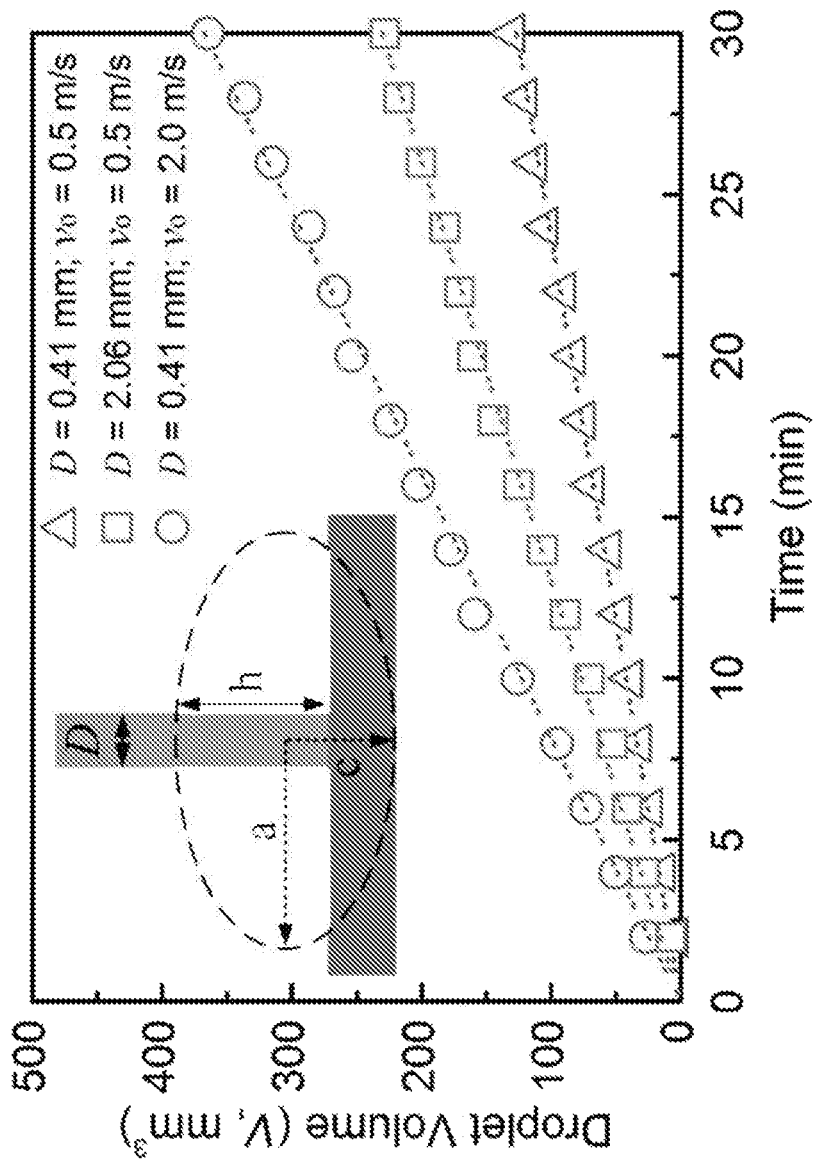
Figures 9A, 9B:
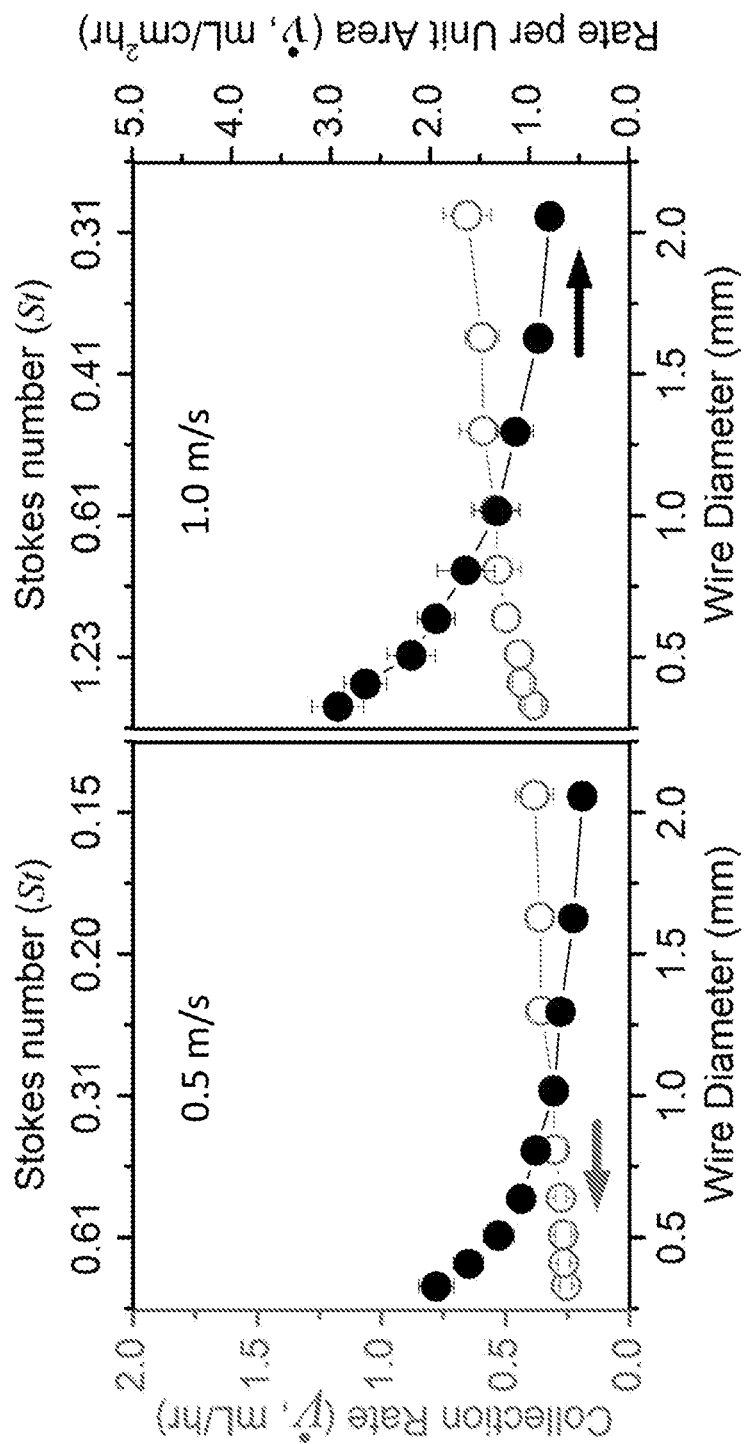
Figures 9C, 9D:
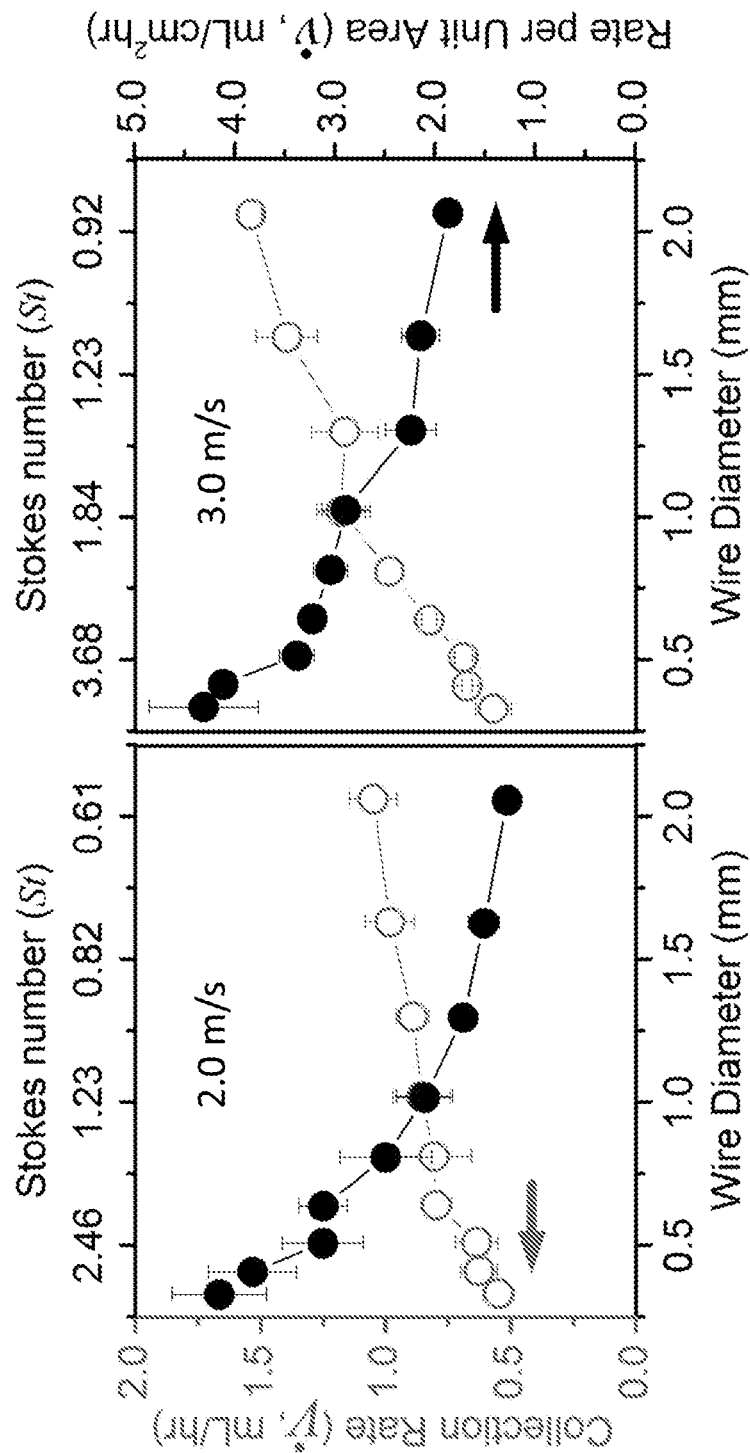

The time evolution of droplet profiles using wires of different diameters under different fog flow speeds were imaged. A sessile droplet with an initial volume of 5 µL was also deposited on a PDMS plate under a fog flow speed of 2 m/s to serve as a control. The fog collection rate was determined by measuring the average rate at which the droplet volume (V) grew over time (images were taken at an interval of 10 seconds over a period up to 30 minutes), approximating the droplet on the PDMS plate to be an ellipsoidal cap while subtracting the volume of the wire within the drop, as $$V = \frac{\pi}{3}a^2c\left(\frac{h}{c}\right)^2\left(3 - \frac{h}{c}\right) - \frac{\pi D^2 h}{4} \quad (4)$$

where a and c represent the long and short semi-axes of the ellipsoid, respectively, and h represents the droplet height, as shown in FIG. 8. (V. A. Lubarda, et al., Langmuir 27, 10705 (2011).) The growth of the droplet deposited on the PDMS plate without a wire by fog droplets impacting on it was significantly smaller (from the initial volume of 5 µL at t=0 min to ~10 µL at t=30 min) than that with a 0.41 mm wire (from 0 µL at t=0 min to ~380 µL at t=30 min) under the same fog flow speed (2 m/s) condition. This result shows that the primary reason for the droplet growth on the PDMS plates was the water captured on the wire, and that therefore the volumetric growth rate of droplets in the experimental setup is a sufficiently accurate measure of the fog collection rate ($\dot{V}$).

Fog collection rates ($\dot{V}$, mL/hr, left y-axis, hollow circles) of the nine wires under various fog flow speeds (0.5, 1.0, 2.0, and 3.0 m/s) were plotted with respect to wire diameter (bottom x-axis) and the Stokes number (top x-axis), shown in FIG. 9A-FIG. 9D, and the corresponding droplet profiles at t=10 min were imaged. The hollow circles on FIG. 9A-FIG. 9D reveal that the fog collection rate increases with an increase in the wire diameter and flow speed. As previously mentioned, a larger Stokes number represents a greater inertial effect on fog collection process, leading to a larger collection efficiency in principle. (W. Shi, et al., ACS Appl. Mater. Interfaces 10, 11979 (2018); K.-C. Park, et al., 2013; and M. Damak et al., Sci. Adv. 4 (2018).) By contrast, the collection rate ($\dot{V}$) measured in the experiments decreases with an increase in the Stokes number, which is opposite to the prediction (Equation 3).

It has been postulated that there is at least one missing system parameter that plays a major role in the physical process of fog capture. Taking into account the difference in the effective area of the wire (i.e., projected area A=40 mm×D) that captures fog droplets, it was found that the fog collection rate per unit area ($\upsilon = \dot{V}/A$, mL/cm²·hr, right y-axis, solid circles) increases with a decrease in the wire diameter and an increase in the Stokes number.

Figure 10A:
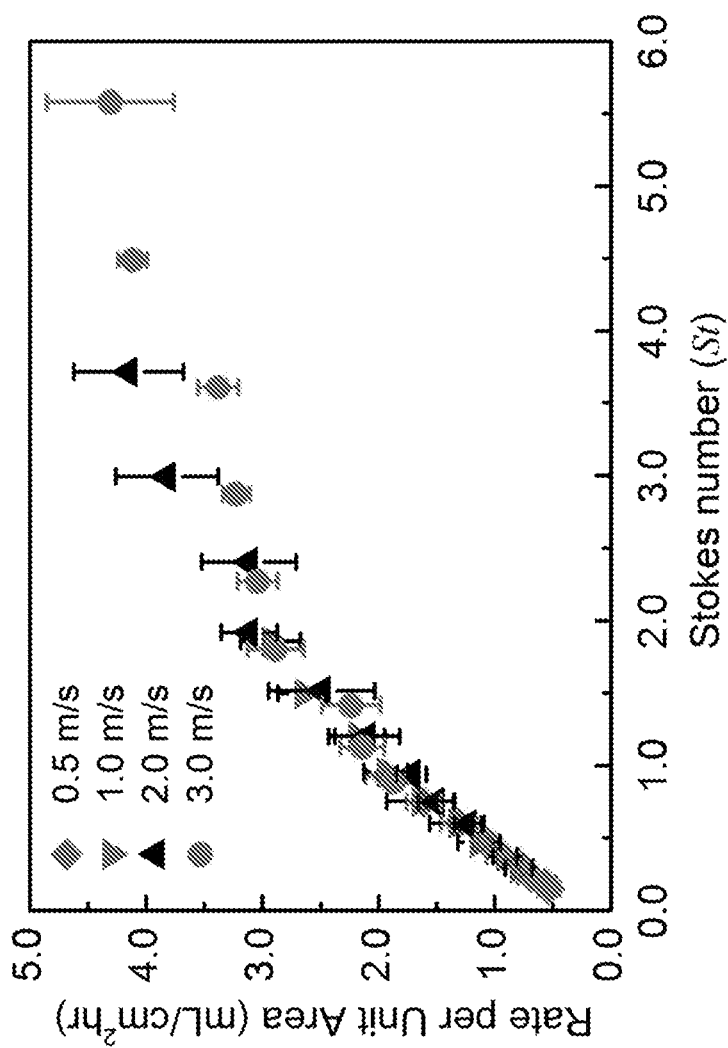
Figure 10B:
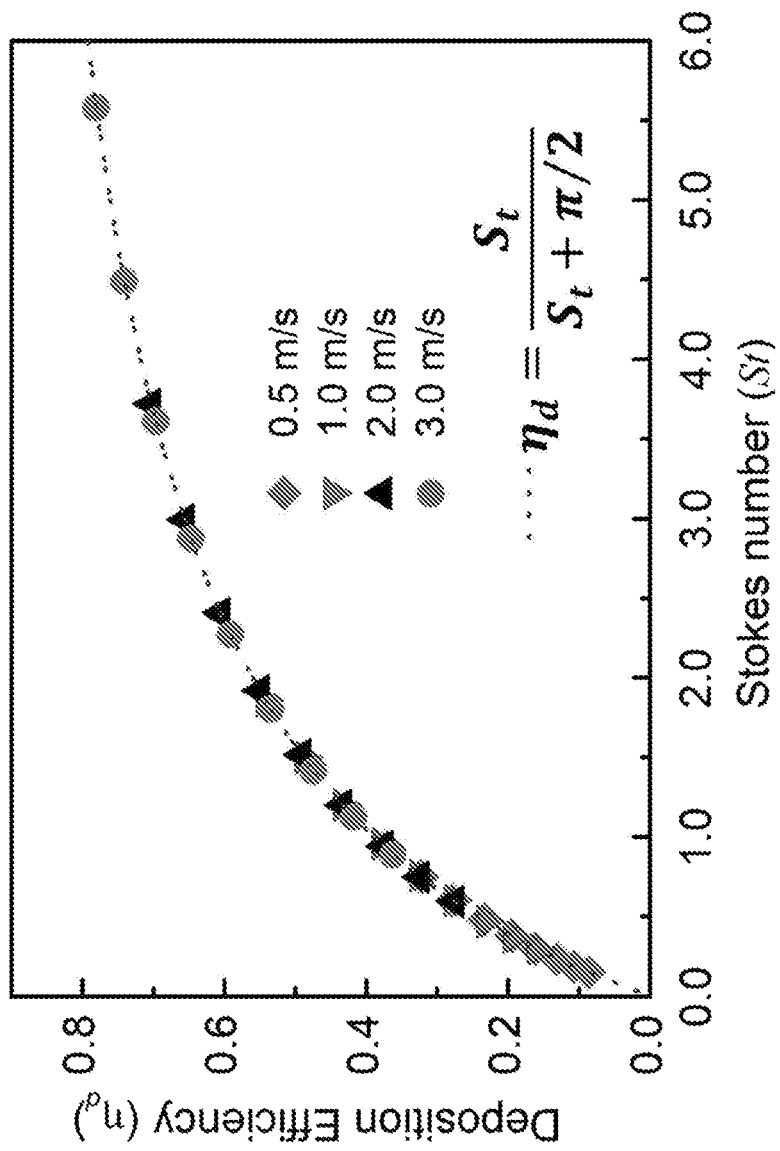
Figure 10C:
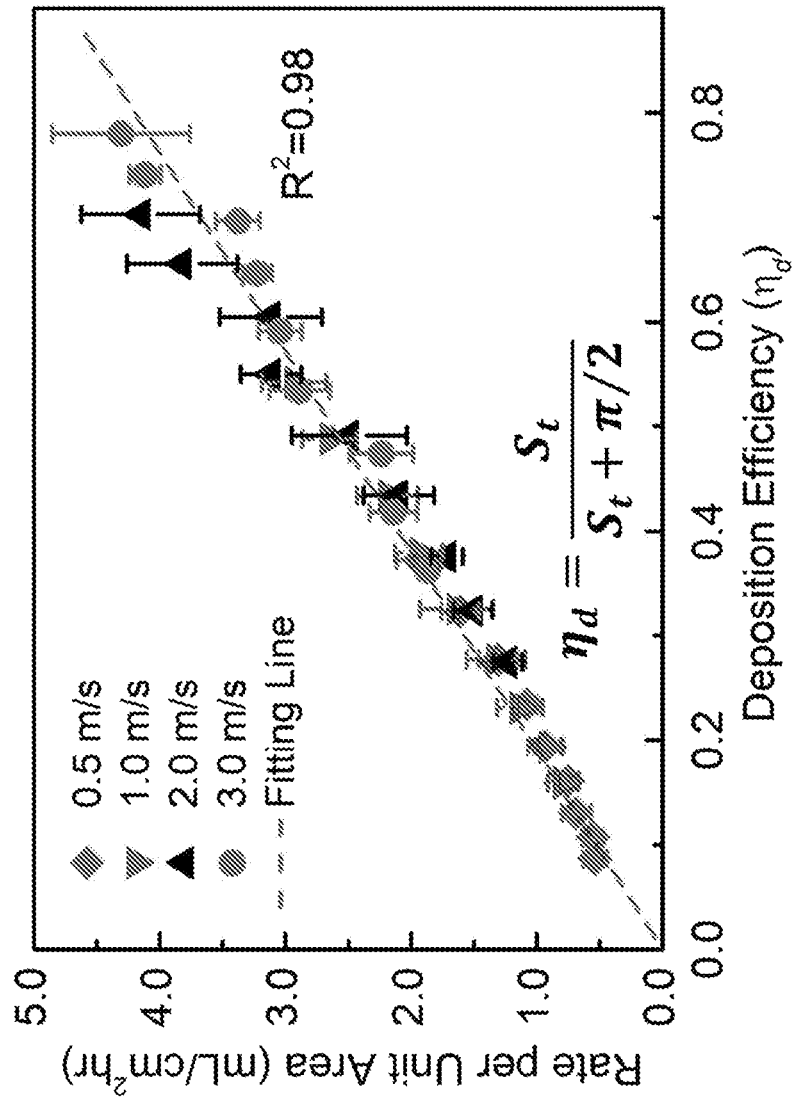

To further explore the correlation between the fog collection rate per unit area ($\upsilon$) and the aerodynamic system parameters, such as the Stokes number (St) and deposition efficiency ($\eta_d$), experimentally measured $\upsilon$ was first plotted with respect to St in FIG. 10A. Meanwhile, a commonly used expression of $\eta_d$ as a function of St, $\eta_d = St/(St+\pi/2)$ was plotted in FIG. 10B. FIG. 10A shows that $\upsilon$ monotonically increases with an increase in St, while FIG. 10B demonstrates a similar trend between $\eta_d$ and St. Therefore, a clear linear correlation ($R^2 \approx 0.98$) between $\upsilon$ and the deposition efficiency ($\eta_d$) using the expression, $\eta_d = St/(St+\pi/2)$, can be obtained as shown in FIG. 10C.

Incorporating the effective area (A) that captures fog droplets, the fog collection rate ($\dot{V} = \upsilon \cdot A$, mL/hr) can be expressed as $$\dot{V} \propto \frac{St}{St+\frac{\pi}{2}} A. \quad (5)$$

This expression implies that the amount of water collected by a wire is mainly determined by the deposition efficiency when the effective surface area is fixed. More importantly, Equation 5 allows estimation of the fog collection rate of a system with a given dimension (e.g., effective area and wire diameter) under a given fog flow condition, based on the collection rate of a reference system.

The aerodynamic collection efficiency ($\eta_{ac}$) was ruled out in this study as the scope was confined to the single wire cases. Thus, Equation 5 may not be precisely applicable to a system composed by multiple wires because the openness of the system can be reduced (clogging), which may decrease the fog collection rate. To verify Equation 5 and its functionality while minimizing the clogging issue, two simple arrays of multiple superhydrophilic wires that are aligned sparsely. $\dot{V}$ of wire arrays with fixed A and various wire diameters (varying the Stokes number and in turn, varying $\eta_d$) were tested and are compared under different wind speeds, using a single wire of D=2.06 mm, four wires of D=0.51 mm (4×0.51 mm), and five wires of D=0.41 mm (5×0.41 mm). $\dot{V}$ of the wire arrays were also predicted (Equation 5) using a ratio of $\eta_d$ and the measured $\dot{V}$ of the single wire under the wind speed of 0.5 m/s. Additionally, profiles of droplets at t=10 min under different wind speeds were measured and showed a great agreement between the measured $\dot{V}$ and the prediction, which validates Equation 5 when the clogging issue is avoided.

The drainage efficiency ($\eta_{dr}$) was ruled out in this study, as the loss by evaporation and re-entrainment of the captured liquid into the air flow was minimized under a laboratory condition with a high humidity. However, fog flow conditions may vary in the field and hence the loss of captured liquid should not be neglected. It is envisioned that a fast transport of any captured liquid to a reservoir would still be favored to maximize the fog collection rate.

Different from a dominant number of studies that have focused on the effects of surface properties on the transport of captured fog droplets, the study reported in this example investigated the effects of aerodynamics-related parameters on fog collection, based on the process of capturing fog droplets, together with the facilitated liquid transport using a superhydrophilic wire. By adopting a vertical, superhydrophilic wire in an environment with precisely-controlled, high humidity, the influence of the aerodynamic collection efficiency and the loss of captured liquid during the transport (drainage efficiency 1) were minimized to explore the exclusive effect of deposition efficiency on fog collection. The experimental results show that the fog collection rate per unit area ($\upsilon$, mL/cm²·hr), not the fog collection rate ($\dot{V}$, mL/hr), is linearly proportional to the deposition efficiency $\eta_d = St/(St+\pi/2)$, which provides new guidance for optimizing the design parameters of fog collectors and mist eliminating systems—high aspect ratio cylindrical geometry and fast liquid film transport on superhydrophilic surfaces.

Materials and Methods

Design of a customized wind tunnel. A wind tunnel made of acrylonitrile butadiene styrene with a total length of 410 mm and an inner square cross-section area of 58 mm×58 mm was printed using a 3D printer (Stratasys Fortus 250MC), similar to the schematic shown in FIG. 7A. A small opening for a sample holder was placed on the ceiling at the midpoint of the wind tunnel and was fitted with a plastic cap to prevent air leakage. A small hole was drilled at the center of the plastic cap to vertically clamp a wire within the wind tunnel. The side wall adjacent to the wire was made of a transparent acrylic sheet (McMaster-Carr, Elmhurst, Ill., USA), which was treated with a commercial, anti-fogging coating (JAWS Quick spit), allowing a clear visualization of the fog collection process from outside the wind tunnel. A fan was attached to the outlet of the tunnel to generate air flow within the tunnel. Wind speeds at the midpoint of the tunnel, where the sample would be placed, were measured using a hot-wire anemometer (Extech 407119). Wind speeds of 0.5 m/s and 1.0 m/s were generated by a fan with dimensions of 80 mm×80 mm×25 mm and adjustable RPM (Thermaltake Mobilefan II), while speeds of 2.0 and 3.0 m/s were generated by a fan with dimensions of 120 mm×120 mm×38 mm (AC Infinity Axial 1238), using an adjustable input voltage generator (VARIAC, Model TDGC2) to control the fan speed.

Preparation of PDMS plates. PDMS (Polydimethylsiloxane) solution (Sylgard 184, Dow Corning, Midland, Mich., USA), with a volume ratio of the curing agent to the silicone elastomer base of 1:10, was poured onto a petri dish and degassed for 24 hours, followed by heating in an oven at 70° C. for 24 hours. Then, the cured PDMS film (thickness: ~3 mm) was peeled from the petri dish and cut into 2 cm×2 cm square plates. A hole corresponding to the various diameters of the wires was drilled at the center of each PDMS plate. A PDMS plate fixed with the bottom end of the wire as a collection site for the captured water flowing down the wire surface is shown in FIG. 7B.

Preparation of superhydrophilic wires. Aluminum wires with nine different diameters of 0.33, 0.41, 0.51, 0.64, 0.81, 1.02, 1.3, 1.63, and 2.06 mm were purchased from McMaster-Carr and cut to 50 mm in length. The aluminum wires were ultrasonically cleaned (Branson 3510, Buffalo Grove, Ill., USA) with a detergent (Alcojet) for 30 minutes and then rinsed with DI water. Then, the cleaned wires were placed in a container with boiling DI water for 30 minutes to produce nanostructures (γ-AlOOH), known as the boehmitization process. (Xia, Y. et al., *J. Phys. Chem. C* 2013, 117, 15279-15286.) An SEM image of the nanotextured surfaces is shown in FIG. 7C, and the profile of a droplet (~3 μL) deposited on a flat surface with such nanotextures is shown in FIG. 7D.

Experimental Procedure. Fog collection experiments were conducted within a customized environmental chamber with dimensions of 865 mm×380 mm×305 mm at room temperature (T=23±1° C.). The chamber was divided into two sections to separate the fog generated by two ultrasonic humidifiers (PEHUMINI, Pure enrichment), as shown in FIG. 7A. One humidifier was placed at the inlet of the wind tunnel to generate the fog to be collected at a flow rate of 80 mL/h. Another humidifier was placed at the end of the tunnel to maintain the humidity of the entire chamber at least 95% during the experiment, minimizing the influence of evaporation and condensation. The average fog droplet radius was measured to be ~5 μm using a high-speed camera (Photron Fastcam Mini AX200) coupled with an objective lens (Nikon M Plan 40×). The fan was turned on once the chamber reached a relative humidity of >95%. The vertically-positioned, superhydrophilic wire had an effective length of 40 mm in the wind tunnel, and the captured fog droplets formed a thin liquid film on the wire, quickly transporting collected water onto the PDMS plate and forming a droplet with a contact angle greater than 90°, growing over time. The fog collection rate was then estimated by measuring the volumetric growth of that water droplet on the PDMS plate using the interval shooting function of a digital camera (Nikon 1 J5, using an interval of 10 seconds over a period up to 30 minutes) coupled with a magnification lens (Nikon AF-S DX at 55 mm). Experiments were performed under four fog flow speed conditions (0.5, 1.0, 2.0, and 3 m/s), and the averaged results of at least three reproducible trials were reported.

Example 2

This example provides a thorough experimental and theoretical investigation into the onset time that considers both the aerodynamics and interfacial phenomena of the system. Onset time is a complicated term that is not only determined by the interfacial phenomena but also the aerodynamics. In particular, it is determined by the retention force (a critical force that allows transport) that retains the apparent water droplet on a solid object (e.g., a wire), a term determined by the interfacial phenomena (e.g., contact angle hysteresis and shape of droplet contact line). It is also determined by the rate at which the fog particles are captured by the solid object (the rate at which the pinned droplet volume increases), a process governed by aerodynamic system parameters (e.g., the Stokes number).

In this example, fog collection experiments were conducted on vertically-positioned aluminum wires so that the gravitational force was the demonstrative force that induced water transport. Wires with four different wettabilities, e.g., hydrophilic (Hphi), hydrophobic (Hpho), superhydrophilic (SHphi), and superhydrophobic (SHpho), were conducted in a custom-made wind tunnel at room temperature (23±1° C.) under relative humidity levels greater than 95%. Wires with eight different diameters ($d_{wire}$=0.33, 0.41, 0.51, 0.81, 1.02, 1.30, 1.63, and 2.06 mm) were tested. The effective wire length (L), the length of exposed wire that is perpendicular to the direction of fog-laden flow, was fixed at 40 mm. Aluminum wires were naturally hydrophilic with an initial static contact angle ($\theta_I$) around 15°, while superhydrophilicity ($\theta_I$<5°) was induced by the implementation of nanostructures via boehmitization. (Xia, Y. et al., *J. Phys. Chem. C* 2013, 117, 15279-15286.). The hydrophilic and superhydrophilic aluminum wires were then coated with fluoroaliphatic phosphoric acid to yield hydrophobic ($\theta_I$=110°) and superhydrophobic ($\theta_I$=165°) wires, respectively. A fog flow rate of 80 mL/h was generated by a humidifier, and the fog flow speed at the position of the wire was controlled at 0.5 m/s. Images were taken at an interval of 10 seconds to visualize the fog collection process.

For the hydrophilic wire, the first deposition of the captured water onto the PDMS (Polydimethylsiloxane) plate, which can be considered as the first transport to a reservoir (effective fog collection), was found at t=230 s while the onset time ($t_{first}$) in fog collection was estimated to be 220 s, as the actual transport should happen between 220 s and 230 s. By contrast, the captured water droplets remained pinned on the hydrophobic wire until t=400 s while the onset time was $t_{first}$=390 s. By that time, three separate droplets on the hydrophilic wire had already been transported to the PDMS plate. Despite such a contrast in the liquid transport (onset time), there was no evident difference in the amount of the collected water on the PDMS plate.

Figure 11:
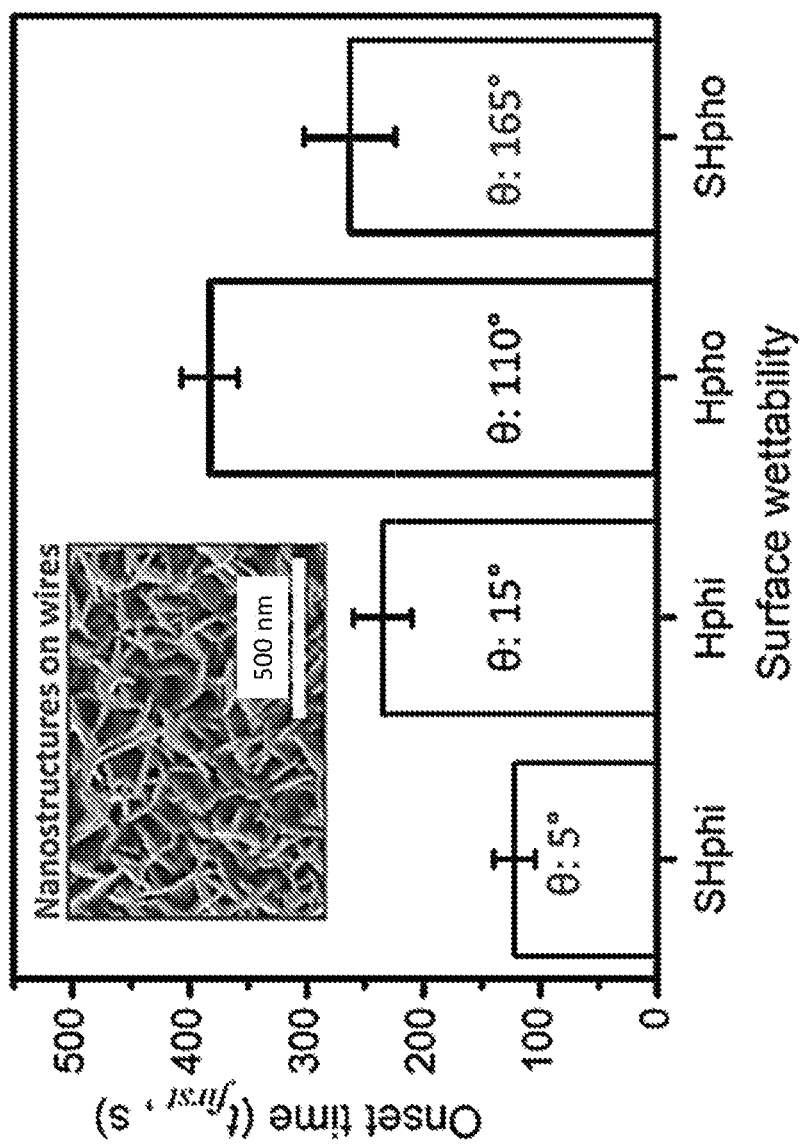
Figure 12:
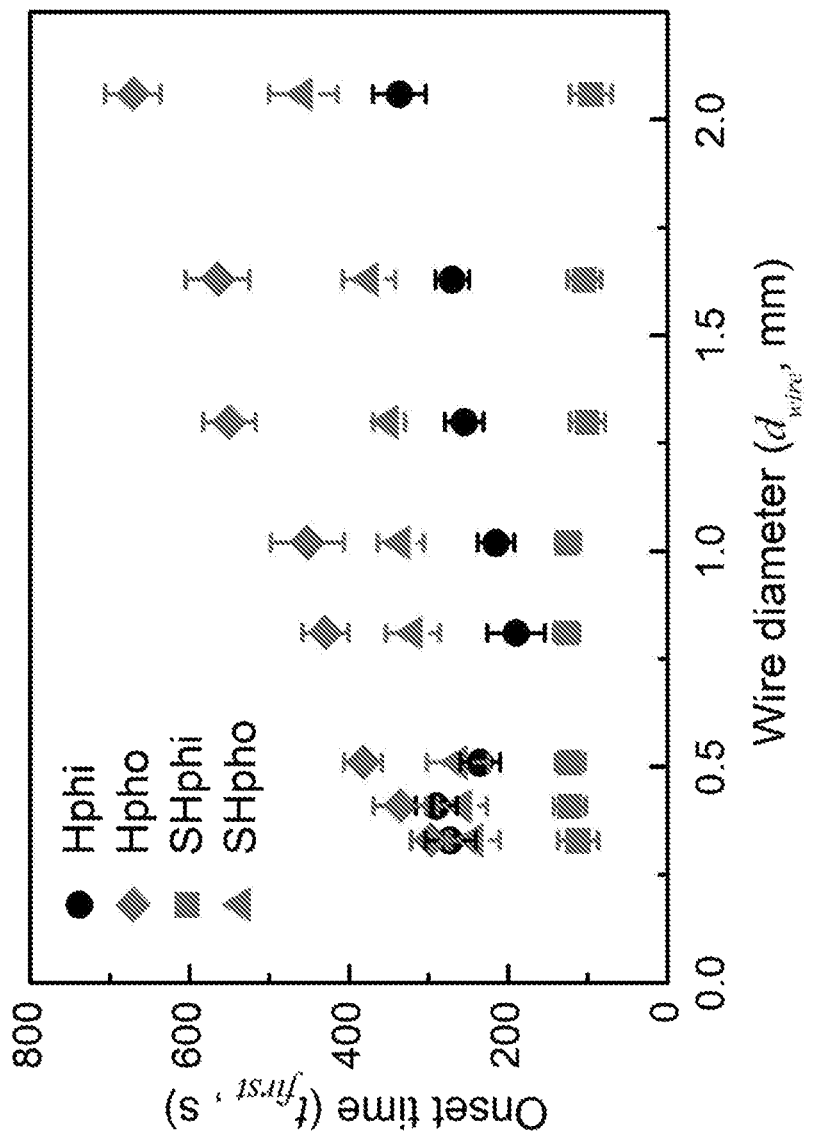

FIG. 11 plots the onset time with respect to surface wettability for 0.51 mm diameter wires. Results suggest that the onset time was affected by the surface wettability in a complex manner, where the largest onset time was observed on the hydrophobic wire, followed by the superhydrophobic wire, the hydrophilic wire, and lastly the superhydrophilic wire, which had the smallest observed onset time. Such a trend generally persists on wires with different diameters (FIG. 12). The onset times remain a constant value (~120 s) on superhydrophilic wires regardless of the variation in diameter. By contrast, the onset time increases with an increase in diameter for most wires with other wettabilities.

The captured water generally wets the front area ($L\pi d_{wire}/2$) of the wire and forms individually pinned droplets uniformly along its length. The pinned droplet base width (W) that is perpendicular to the potential transport direction (vertical) is therefore $\pi d_{wire}/2$. Assuming that external stimuli are negligible, such as the vibration of the wire induced by wind (0.5 m/s), the critical volume ($V_c$) of a droplet that allows transport by gravity can be expressed as, (Extrand, C. W. et al., *Journal of Colloid and Interface Science* 1995, 170, 515-521; ElSherbini, A. et al., *Journal of Colloid and Interface Science* 2006, 299, 841-849; Antonini, C. et al., *Langmuir* 2009, 25, 6143-6154.)

$$V_c = \gamma_{LG} k \frac{\pi d_{wire}}{2\rho_{water} g} (\cos\theta_r - \cos\theta_a) \quad (6)$$

which is linearly proportional to $d_{wire}(\cos\theta_r - \cos\theta_a)/2 \cdot \gamma_{LG}$, $\rho_{water}$, and g denotes the liquid-gas interfacial tension, water density, and gravitational acceleration, respectively. k represents a numerical factor that accounts for the varying contact angles along the droplet boundary. $\theta_r$ and $\theta_a$ represent the receding contact angle at the droplet rear and the advancing contact angle at the front, respectively. The time during transport is negligible once the pinned droplet rolls off under gravity. Hence, the time taken for the pinned droplet to capture fog particles until its weight exceeds the retention force equals the onset time. Then, the corresponding critical volume can be also expressed as, $$V_c = \dot{\upsilon} \cdot A_{eff} \cdot t_{first}, \quad (7)$$

where $\dot{\upsilon}$ represents the fog collection rate per unit area, which is determined by the aerodynamic system dimensionless parameters (Rivera, J., *Atmos. Res.* 2011, 102, 335-342.), denoted as, $$\dot{\upsilon} \propto \eta_{ac} \cdot \eta_d \cdot \eta_{dr}. \quad (8)$$

Aerodynamic collection efficiency ($\eta_{ac}$) characterizes the percentage of the fog particles in the unperturbed fog-laden flow that would collide with the wires. Deposition efficiency ($\eta_d$) represents the ratio of fog particles deposited on a wire to the population in their initial trajectory toward the wire, which increases with an increase in the Stokes number (St), since $\eta_d = St/(St+\pi/2)$. (Park, K.-C. et al., *Langmuir* 2013, 29, 13269-13277; Shi, W. et al., *ACS Appl. Mater. Interfaces* 2018, 10, 11979-11986; Damak, M. et al., *Sci. Adv.* 2018, 4.). The Stokes number is a function of $\rho_{water}$, the average radius of the fog droplets ($r_{fog}$), air viscosity ($\mu_{air}$), fog flow speed ($\upsilon_o$), and $d_{wire}$, and can be written as $St=(4\rho_{water} r_{fog}^2/9\mu_{air})/(d_{wire}/\upsilon_o)$. Drainage efficiency ($\eta_{dr}$) represents the ratio of the amount of liquid transported to a reservoir to the total amount of captured liquid by the collector (e.g., wires). Evaporation and re-entrainment of the captured liquid into the fog-laden wind lead to a decrease in $\eta_{dr}$. $A_{eff}$ denotes the effective area of a pinned droplet that captures fog particles, which contributes to the increase in the gravitational force (a function of $V_c$). The retention force (Equation 6) is determined by the length of contact line perpendicular to gravity rather than that in parallel or the droplet base area. Thus, $A_{eff}$ should be proportional to the length of contact line ($A_{eff} \therefore d_{wire}$). Combining Equations 6-8, the onset time ($t_{first}$) can be represented by a non-dimensionalized term as, $$t^*_{first} \propto \frac{\cos\theta_r - \cos\theta_a}{2 \cdot \eta_{ac} \cdot \eta_d \cdot \eta_{dr}}. \quad (9)$$

$\eta_{ac}$ is one for a single wire system and less than one for multiple wire systems. $\eta_{dr}$ is also roughly one, as the evaporation and re-entrainment of the captured liquid are negligible under high humidity conditions and low wind speeds (e.g. 0.5 m/s, above which the captured droplets on wires with low contact angle hysteresis, such as SHpho, can be removed by the air drag force). For a single wire, $t_{first}^*$ is given as, $$t^*_{first} \propto \frac{\cos\theta_r - \cos\theta_a}{2\eta_d}. \quad (10)$$

Theoretically, the onset time is synergistically determined by the contact angle hysteresis and the deposition efficiency. Equation 10 is based on the fact that the fog collection rate per unit area ($\dot{\upsilon}$) of a single wire is not a function of surface wettability at low wind speeds (e.g. 0.5 m/s), which was experimentally confirmed.

Figure 13:
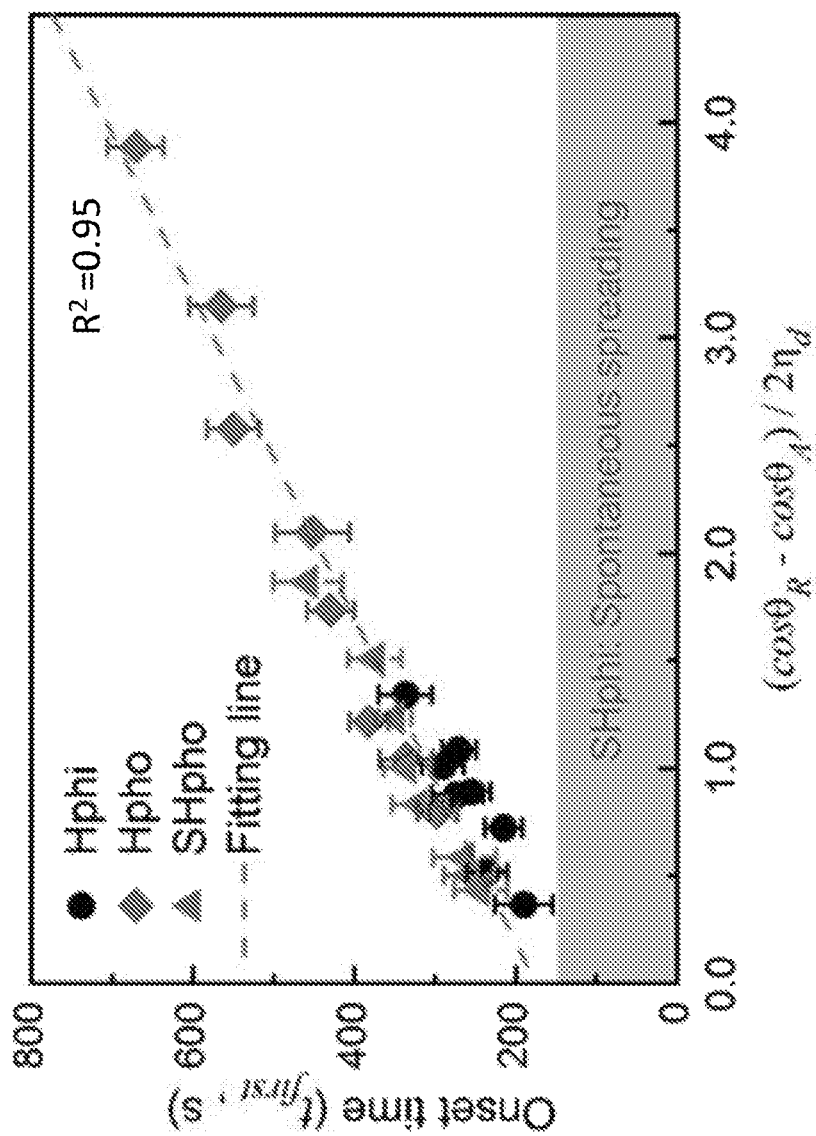
Figure 14:
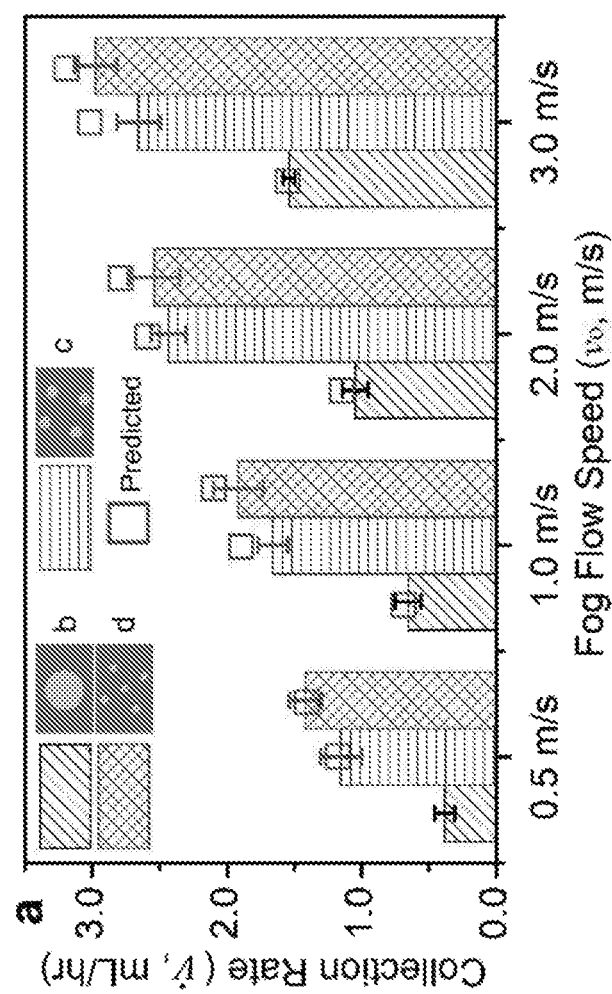

A linearity between the experimentally-measured onset times and the non-dimensionalized onset times for hydrophilic, hydrophobic, and superhydrophobic wires is demonstrated in FIG. 13, which validates Equation 10. Receding ($\theta_r$) and advancing ($\theta_a$) contact angles were measured before the pinned droplet slid off the wire (see Table 1 below). Droplets on thin hydrophilic wires ($d_{wire} \leq 0.51$ mm) tended to surround the entire wire with $W \approx \pi d_{wire}$, and hence $t_{first}^*$ is given as $(\cos\theta_r - \cos\theta_a)/\eta_d$. This modification to Equation 10 accounts for the sudden increase in the measured onset times on hydrophilic wires as $d_{wire}$ decreased below 0.51 mm (FIG. 12).

TABLE 1

Measured advancing ($\theta_a$) and receding ($\theta_r$) contact angles of apparent droplets on hydrophilic, hydrophobic, and superhydrophobic wires.

| | Hydrophilic | | Hydrophobic | | Superhydrophobic | |
|---|---|---|---|---|---|---|
| $d_{wire}$ (mm) | $\theta_a$ (°) | $\theta_r$ (°) | $\theta_a$ (°) | $\theta_r$ (°) | $\theta_a$ (°) | $\theta_r$ (°) |
| 0.33 | 80 | 60 | 140 | 100 | 165 | 130 |
| 0.41 | 80 | 60 | 120 | 80 | 165 | 130 |
| 0.51 | 60 | 50 | 120 | 80 | 165 | 130 |
| 0.81 | 45 | 20 | 120 | 80 | 165 | 130 |
| 1.02 | 45 | 20 | 120 | 80 | 165 | 130 |
| 1.30 | 45 | 20 | 120 | 80 | 165 | 130 |
| 1.63 | 45 | 20 | 120 | 80 | 165 | 130 |
| 2.06 | 45 | 20 | 120 | 80 | 165 | 130 |

There is an error bar (±5°) for all the measured contact angles.

For superhydrophilic surfaces for which the advancing contact angle ($\theta_a$) approaches 0°, water spontaneously spreads over the surface and forms a thin film. The transport dynamics of the thin film are not governed by the contact angle hysteresis, which explains the constant onset times (~120 s) on superhydrophilic wires. The linear fitting line does not pass through the origin but has an ordinate intercept of around 120 s, which corresponds to the constant onset time of superhydrophilic wires. This threshold value (120 s) may be explained by the fact that the captured fog droplets on Hphi, Hpho, and SHpho wires need time to accumulate and coalesce to form macro-scale droplets before Equation 10 applies. For superhydrophilic wires, the captured tiny fog particles (~5 µm in radius) need time to form a film surrounding the wire before being transported to the PDMS plate with detectable volume.

Different from previous studies on fog collection, this example introduces a new physical term, onset time, which characterizes the time required to transport the initial captured liquid to a reservoir. Corroborated by experiments conducted on single wires with various wettabilities and diameters, the onset time is found to be inversely proportional to the deposition efficiency, which describes the aerodynamic capturing process of fog droplets, and proportional to the contact angle hysteresis, which characterizes the droplet-surface retention. Superhydrophilic wires induce the smallest onset time, as the transport of the captured liquid is essentially spontaneous. This example provides an important perspective in fog collection and offers guidelines for the design of fog collectors.

Materials and Methods

Design of a customized wind tunnel. A wind tunnel made of acrylonitrile butadiene styrene with a total length of 410 mm and an inner square cross-section area of 58 mm×58 mm was printed using a 3D printer (Stratasys Fortus 250MC), similar to the schematic shown in FIG. 7A. A small opening for a sample holder was placed on the ceiling at the midpoint of the wind tunnel and was fitted with a plastic cap to prevent air leakage. A small hole was drilled at the center of the plastic cap to vertically clamp a wire within the wind tunnel. The side wall adjacent to the wire was made of a transparent acrylic sheet (McMaster-Carr, Elmhurst, Ill., USA), which was treated with a commercial, anti-fogging coating (JAWS Quick spit), allowing a clear visualization of the fog collection process from outside the wind tunnel. A fan was attached to the outlet of the tunnel to generate air flow within the tunnel. Wind speeds at the midpoint of the tunnel, where the sample would be placed, were measured using a hot-wire anemometer (Extech 407119). Wind speeds of 0.5 m/s and 1.0 m/s were generated by a fan with dimensions of 80 mm×80 mm×25 mm and adjustable RPM (Thermaltake Mobilefan II), while speeds of 2.0 and 3.0 m/s were generated by a fan with dimensions of 120 mm×120 mm×38 mm (AC Infinity Axial 1238), using an adjustable input voltage generator (VARIAC, Model TDGC2) to control the fan speed.

Preparation of aluminum wires with different wettabilities. Aluminum wires with eight different diameters of 0.33, 0.41, 0.51, 0.81, 1.02, 1.30, 1.63, and 2.06 mm were purchased from McMaster-Carr and cut to 50 mm in length. The aluminum wires were ultrasonically cleaned (Branson 3510, Buffalo Grove, Ill., USA) with a detergent (Alcojet) for 30 minutes and then rinsed with deionized (DI) water. The cleaned aluminum wires served as the hydrophilic (Hphi) wires. Then, the cleaned wires were placed in a container with boiling DI water for 30 minutes to produce nanostructures ($\gamma$-AlOOH). This process is known as the boehmitization process. The aluminum wires decorated with nanostructures served as the superhydrophilic (SHphi) wires. Then, the just-cleaned wires and those decorated with nanostructures were put into a solution (a weight ratio of the ethanol to fluoroaliphatic phosphoric acid at 100:1) under a temperature of 70° C. (in an oven) for 30 minutes for surface hydrophobilization. The cleaned wires with hydrophobic coating served as the hydrophobic (Hpho) wires, while the nano-textured wires with hydrophobic coating served as the superhydrophobic (SHpho) wires.

Preparation of PDMS plates. PDMS (Polydimethylsiloxane) solution (Sylgard 184, Dow Corning, Midland, Mich., USA), with a volume ratio of the curing agent to the silicone elastomer base of 1:10, was poured onto a petri dish and degassed for 24 hours, followed by heating in an oven at 70° C. for 24 hours. Then, the cured PDMS film (thickness: ~3 mm) was peeled from the petri dish and cut into 2 cm×2 cm square plates. A hole corresponding to the various diameters of the wires was drilled at the center of each PDMS plate. The PDMS plate was fixed with the bottom end of the wire as a collection site for the captured water flowing down the wire surface.

Experimental Procedure. Fog collection experiments were conducted within a customized environmental chamber with dimensions of 865 mm×380 mm×305 mm at room temperature (T=23±1° C.). The chamber was divided into two sections to separate the fog generated by two ultrasonic humidifiers (PEHUMINI, Pure enrichment), as shown in FIG. 7A. One humidifier was placed at the inlet of the wind tunnel to generate the fog to be collected at a flow rate of 80 mL/h. Another humidifier was placed at the end of the tunnel to maintain the humidity of the entire chamber at least 95% during the experiment, minimizing the influence of evaporation and condensation. The average fog droplet radius was measured to be ~5 µm using a high-speed camera (Photron Fastcam Mini AX200) coupled with an objective lens (Nikon M Plan 40×). The fan was turned on once the chamber reached a relative humidity of>95%. The deposition process of the fog droplets was captured using the interval shooting function of a digital camera (Nikon 1 J5, using an interval of 10 seconds over a period up to 30 minutes) coupled with a magnification lens (Nikon AF-S DX at 55 mm). Experiments were performed only at 0.5 m/s to ensure that the captured fog droplets on superhydrophobic (SHpho) wires would not be removed by the air flow. Averaged results of at least three reproducible trials were reported.

Example 3

This example described liquid harvesting using a device comprising a plurality of wires within a tubular support surface. The relevant system properties were as follows: 3D wires were in a circular tube with in internal diameter: 7.8 cm and the total solid surface area:

3 cm·0.206 cm·8(wires per plane)·3(number of planes) =15 cm².

For superhydrophilic wires, the mass of the collected fog was 24.5 g for 1.5 hours. Thus, the fog collection rate was 16 g/h. The fog collection rate per unit area was:

$$16\frac{g}{h} \Big/ 30 \text{ cm}^2 = 1.1 \text{ g/cm}^2\text{h}$$

For superhydrophilic 2D meshes having wire diameters of 0.01' and 0.015' spacing, the solid fraction was 0.64. The cross-sectional area of the pipe was 48 cm². Hence, the total solid surface area that was facing the water droplet-laden flow was:

48 cm²·0.64=30 cm²

The mass of the collected water was 1.771 g for 1.5 hours. Thus, the water collection rate is 1.2 g/h. The fog collection rate per unit area was:

$$1.2\frac{g}{h} \Big/ 30 \text{ cm}^2 = 0.04 \text{ g/cm}^2\text{h}$$

For a mesh with wire diameters of 0.035' and spacing of 0.132', the solid fraction was 0.38.

The cross-sectional area of the tube was 48 cm². Hence, the total solid surface area that is facing the water droplet-laden flow was:

48 cm²·0.38=18 cm²

The mass of the collected fog was 25 g for 1.5 hours. Thus, the fog collection rate was 16.7 g/h.

The fog collection rate per unit area was:

$$16.7\frac{g}{h} \Big/ 18 \text{ cm}^2 = 0.93 \text{ g/cm}^2\text{h}$$

In summary, when the surface wettability was fixed, the 3D wire system outperformed the 2D mesh system by comparing the water collection rate per unit area, such as, 3D wire:mesh 0.01':mesh 0.035'=1.1:0.04:0.93

However, if we consider the fog collection rate, not the rate per unit area, the ratio is:

3D wire:mesh0.01':mesh0.035'=16:1.2:16.7.

The reason that the water collection rate is extremely low for the meshes with fine wires (0.01' in diameter) is the clogging on the meshes blocks the air flow. The reason that the fog collection rate of meshes with coarse wires (0.035') is improved is that the clogging issue has been prevented and the total solid surface area that collects water droplets is larger than the 3D wire system, although the fog collection rate per unit area of the 3D wire system is better.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An airborne liquid droplet harvesting device comprising:
    a tube having an interior surface that defines an air channel having a central longitudinal axis; and
    a plurality of mechanically flexible polymeric wires extending from the interior surface into the air channel, wherein the mechanically flexible polymeric wires are characterized in that the wires bend elastically along a direction of air flow when a flow of air comprising airborne liquid droplets is directed through the air channel, the wires having diameters in the range from 10 µm to 10 mm and free distal ends that extend radially into the air channel and toward, to, or through the central longitudinal axis.

2. The device of claim 1, wherein the wires define an angle of at least 100° with respect to the interior surface of the air channel.

3. The device of claim 2, wherein the wires are metallic.

4. The device of claim 1, wherein the wires have a water contact angle of 30° or less.

5. The device of claim 1, wherein the wires have a water contact angle of 10° or less.

6. The device of claim 1, wherein the wires have a water contact angle of 5° or less.

7. The device of claim 1, wherein the wires have a density in the range from $10^4$ to $10^{10}$ per $m^2$ on the interior surface.

8. The device of claim 1, wherein the air channel has an internal diameter in the range from 50 µm to 500 mm.

9. The device of claim 1, wherein the wires have lengths shorter than an internal diameter of the tube.

10. The device of claim 1, wherein the wires do not extend to the central longitudinal axis of the air channel.

11. The method of claim 1, wherein the wires are arranged in multiple wire groups and the wire groups are spaced apart along the central longitudinal axis.

12. An airborne liquid droplet harvesting array comprising a plurality of airborne liquid droplet harvesting devices within a housing, each airborne liquid droplet harvesting device comprising:
    a tube having an interior surface that defines an air channel having a central longitudinal axis; and
    a plurality of mechanically flexible polymeric wires extending from the interior surface into the air channel, wherein the mechanically flexible polymeric wires are characterized in that the wires bend elastically along a direction of air flow when a flow of air comprising airborne liquid droplets is directed through the air channel, the wires having diameters in the range from 10 µm to 10 mm and free distal ends that extend radially into the air channel and toward, to, or through the central longitudinal axis, wherein the liquid airborne harvesting devices are aligned along the central longitudinal axes of the air channels within the housing.

13. A method of collecting airborne liquid droplets using an airborne liquid droplet harvesting device comprising:
    a tube having an interior surface that defines an air channel having a central longitudinal axis; and
    a plurality of mechanically flexible polymeric wires extending from the interior surface into the air channel, the wires having diameters in the range from 10 µm to 10 mm and free distal ends that extend radially into the air channel and toward, to, or through the central longitudinal axis, the method comprising directing a flow of air comprising airborne liquid droplets through the air channel, wherein the liquid droplets are captured on the wires, the flow of air causes the mechanically flexible polymeric wires to bend elastically along the direction of air flow, and the captured liquid drains away from the wires and is collected in the air channel.

14. The method of claim 13, wherein the wires have a contact angle of 30° or less for the liquid being harvested at the temperature of the air flow.

15. The method of claim 13, wherein the wires define an angle of at least 100° with respect to the interior surface of the air channel.

16. The method of claim 13, wherein the wires have lengths shorter than an internal diameter of the tube.

17. The method of claim 13, wherein the wires do not extend to the central longitudinal axis of the air channel.

* * * * *